(12) United States Patent
Kreidler et al.

(10) Patent No.: US 11,035,381 B2
(45) Date of Patent: Jun. 15, 2021

(54) BLOWER, ELECTRIC MACHINE AND ASSOCIATED METHOD

(71) Applicant: Regal Beloit America, Inc., Beloit, WI (US)

(72) Inventors: Jason Jon Kreidler, Sheboygan Falls, WI (US); Rafal Pawel Rohoza, Melbourne (AU); Edward L Drye, Troy, OH (US); C Scott Eagleton, Wausau, WI (US); Mark Lyon Klopp, Berne, IN (US); Michael Allen Marks, Fort Wayne, IN (US)

(73) Assignee: REGAL BELOIT AMERICA, INC., Beloit, WI (US)

( * ) Notice: Subject to any disclaimer, the term of this patent is extended or adjusted under 35 U.S.C. 154(b) by 467 days.

(21) Appl. No.: 15/265,398

(22) Filed: Sep. 14, 2016

(65) Prior Publication Data
US 2017/0074286 A1 Mar. 16, 2017

Related U.S. Application Data

(60) Provisional application No. 62/219,250, filed on Sep. 16, 2015.

(51) Int. Cl.
*F04D 29/58* (2006.01)
*F04D 29/28* (2006.01)
(Continued)

(52) U.S. Cl.
CPC ......... *F04D 29/5813* (2013.01); *F04D 17/16* (2013.01); *F04D 25/06* (2013.01);
(Continued)

(58) Field of Classification Search
CPC ...... F04D 29/2813; F04D 29/28; F04D 29/44; F04D 25/082; F04D 25/06; F04D 17/16;
(Continued)

(56) References Cited

U.S. PATENT DOCUMENTS 5,784,894 A * 7/1998 Army, Jr. .............. F24F 5/0085
  62/402
5,813,060 A * 9/1998 Klopocinski ............. E03D 9/08
  4/213
(Continued)

FOREIGN PATENT DOCUMENTS

CN    101852215 A    10/2010
DE    19546040 A1    6/1996
(Continued)

OTHER PUBLICATIONS

Extended European Search Report Application No. 16189192.4-1610 dated Feb. 15, 2017, 10 pages.
(Continued)

*Primary Examiner* — Essama Omgba
*Assistant Examiner* — Christopher J Brunjes
(74) *Attorney, Agent, or Firm* — Armstrong Teasdale LLP

(57) ABSTRACT

A blower includes an impeller housing, an impeller rotatably secured to the housing and an electric motor. The motor has a motor housing with a central portion and a radially extending portion extending from the central portion, a venturi chamber adjacent the motor housing and opposed to the impeller housing, a stator secured to the central portion of the motor housing, a rotor rotatably secured to the central portion of the housing, and at least one heat generating electrical component secured to the radially extending portion of the motor housing. The impeller housing has a first air pressure therein and the motor housing has a second air pressure therein different that the first air pressure. The venturi housing and the motor housing define a passageway therebetween whereby the difference in air pressure generates air flow within the motor housing to cool the at least one heat generating electrical component.

14 Claims, 31 Drawing Sheets

(51) Int. Cl.
  *F04D 25/06* (2006.01)
  *F04D 25/08* (2006.01)
  *H02K 9/06* (2006.01)
  *H02K 11/33* (2016.01)
  *F04D 29/44* (2006.01)
  *F04D 17/16* (2006.01)
  *H02K 7/14* (2006.01)

(52) U.S. Cl.
  CPC ........... *F04D 25/082* (2013.01); *F04D 29/28* (2013.01); *F04D 29/44* (2013.01); *H02K 7/14* (2013.01); *H02K 9/06* (2013.01); *H02K 11/33* (2016.01); *F05B 2240/12* (2013.01); *F05B 2240/14* (2013.01); *F05B 2240/30* (2013.01); *F05B 2240/50* (2013.01)

(58) Field of Classification Search
  CPC .............. F05B 2240/50; F05B 2240/14; F05B 2240/30; F05B 2240/12; H02K 7/14; H02K 9/06; H02K 11/33
  See application file for complete search history.

(56) References Cited

U.S. PATENT DOCUMENTS

| | | | |
|---|---|---|---|
| 8,251,674 B1 | 8/2012 | Pairaktaridis | |
| 2013/0167826 A1* | 7/2013 | Feld | H02K 7/14 |
| | | | 126/299 D |
| 2014/0265664 A1* | 9/2014 | Camilleri | H02K 15/14 |
| | | | 310/59 |
| 2015/0042213 A1* | 2/2015 | Bradfield | H02K 9/06 |
| | | | 310/60 R |
| 2016/0285339 A1* | 9/2016 | Smith | H02K 11/30 |

FOREIGN PATENT DOCUMENTS

| | | |
|---|---|---|
| DE | 102013203500 A1 | 9/2014 |
| FR | 2946864 A1 | 10/2010 |

OTHER PUBLICATIONS

First Office Action for related CN Patent Application No. 201610987288.5 dated Mar. 29, 2019; 13 pp.

* cited by examiner

BLOWER, ELECTRIC MACHINE AND ASSOCIATED METHOD

CROSS REFERENCE TO RELATED APPLICATION

This application is a non-provisional application and claims priority to U.S. Provisional Patent Application 62/219,250 filed Sep. 16, 2015 for "BLOWER, ELECTRIC MACHINE AND ASSOCIATED METHOD", which is hereby incorporated by reference in its entirety.

BACKGROUND

The embodiments described herein relate generally to electrical machines, and more particularly, to an axial flux electrical machine including an integrated controller for use in fluid circulating systems.

Many known commercial heating, ventilation, and air conditioning (HVAC) systems require air propulsion units. In addition to providing movement of air for HVAC systems, air propulsion units may be used in combination with condenser units and to supplement other heat transfer operations. Some known air propulsion units include motor driven fans. These fans include, for example, a centrifugal impeller type fan driven by a radial flux motor. However, some known radial flux motors and their mounting components extend a certain distance into the fan cavity. This restricts air flow through the fan and yields aerodynamic losses that adversely affect fan performance.

Moving the air propulsion unit outside of the fan cavity causes an overall thickness of the assembly to increase significantly and further requires that the fan be attached to a shaft of the motor using various coupling mechanisms attached to the fan. These known coupling mechanisms further add to the fan assembly thickness and introduce weight and complexity to the fan assembly. Furthermore, the cost is increased in such fan assemblies due to the increased part count required for coupling the fan to the motor shaft.

In addition, many known air propulsion units include an integrated controller attached to an end of the unit, thereby further increasing the thickness of the fan assembly. To reduce the thickness of the air propulsion unit, many known units include complex controller board arrangements and layout that can add cost and complexity to the unit, and introduce localized heating from the heat generating components that is not adequately dissipated.

Further, localized heating of the heat generating components provide challenges to efficiently and effectively cooling those heat generating components while minimizing the power and air flow losses required to provide such cooling.

BRIEF DESCRIPTION

The embodiments described herein relate generally to an electric machine, and more specifically, to an electric machine which includes a heat generating electrical component. The embodiments include various cooling methodologies for cooling heat generating electrical component an axial flux motor with a central housing portion for supporting a stator and a radially extending housing portion extending from the central housing portion, the radially extending housing portion containing the heat generating electrical component.

An electric machine is typically in the form of an electric generator or an electric motor. The machine typically has a centrally located shaft that rotates relative to the machine. Electrical energy applied to coils within the motor initiates this relative motion which transfers the power to the shaft and, alternatively, mechanical energy from the relative motion of the generator excites electrical energy into the coils. For expediency the machine will be described hereinafter as a motor. It should be appreciated that a motor may operate as a generator and vice versa.

Electrical motors typically have magnetic flux that is oriented in either the axial direction or the radial direction. While most motors have their magnetic flux oriented in the radial direction, a number of motors have magnetic flux oriented in the axial direction. For motors, for example, axial flux motors, particularly motors with electronic controls, electrical components generate heat. Placing the electrical components in a portion of the housing separated from the motor may provide improved component cooling.

According to an aspect of the present invention, a fan blade is attached to a motor. The blade generates an air flow. The air flow is directed onto the heat generating electrical component.

According to an aspect of the present invention, a blower, is provided. The blower includes a blower housing, an impeller and an electric motor. The impeller is rotatably secured to the housing.

The electric motor has a motor housing with a central portion and a radially extending portion extending from the central portion. The motor also has a stator secured to the central portion of the motor housing, a rotor rotatably secured to the central portion of the housing, at least one heat generating electrical component secured to the radially extending portion of the motor housing, and a fan. The fan is attached to the motor and is adapted to cool the at least one heat generating electrical component.

According to an aspect of the present invention, the blower may be provided wherein the fan includes a radial flow fan.

According to another aspect of the present invention, the blower may be provided wherein the fan comprises a forwardly curved fan.

According to another aspect of the present invention, the blower may be provided wherein the fan comprises a backwardly curved fan.

According to another aspect of the present invention, the blower may be provided wherein the fan comprises an axial flow fan.

According to another aspect of the present invention, the blower may further include a regulator for regulating a flow of air from the fan toward the component.

According to another aspect of the present invention, the blower may further include a second radially extending portion extending from the central portion and spaced from the first mentioned radially extending portion.

According to another aspect of the present invention, the blower may further include a shroud positioned in the flow of air from the fan toward the component.

According to another aspect of the present invention, the blower may be provided wherein the shroud is adapted to at least one of to control exit area to match fan inlet area and to optimize area exits to locations where application might help with cooling.

According to another aspect of the present invention, the blower may be provided wherein the central portion of the motor housing defines a centrally located opening therethrough, the opening providing a fan inlet for the fan.

According to another aspect of the present invention, the blower may be provided wherein the radially extending portion of the motor housing defines a fan outlet thereof.

According to another aspect of the present invention, the blower may be provided wherein the fan outlet includes a regulator for modifying air flow through the fan outlet.

According to another aspect of the present invention, the blower may be provided wherein the motor housing is adapted to regulate the amount of cooling going to the radially extending portion of the motor housing.

According to another aspect of the present invention, the blower may be provided wherein the motor housing and the fan is adapted to provide an air flow directed radially outwardly.

According to another aspect of the present invention, the blower may be provided wherein the motor housing and the fan is adapted to provide an air flow directed radially inwardly.

According to another aspect of the present invention, a motor may be provided. The motor includes a housing with a central portion and a radially extending portion extending from the central portion. The motor also includes a stator secured to the central portion of the housing and a rotor rotatably secured to the central portion of the housing. The motor also includes at least one heat generating electrical component secured to the radially extending portion of the housing and a fan attached to the housing and adapted to cool the at least one heat generating electrical component.

According to an aspect of the present invention, the motor may be provided wherein the fan comprises a radial flow fan.

According to another aspect of the present invention, the motor may be provided wherein the fan comprises a forwardly curved fan.

According to another aspect of the present invention, the motor may be provided wherein the fan comprises a backwardly curved fan.

According to another aspect of the present invention, the motor may be provided wherein the fan comprises an axial flow fan.

According to another aspect of the present invention, the motor may further include a regulator for regulating a flow of air from the fan toward the component.

According to another aspect of the present invention, the motor may further include a second radially extending portion extending from the central portion and spaced from the first mentioned radially extending portion.

According to another aspect of the present invention, the motor may further include a shroud positioned in the flow of air from the fan toward the component.

According to another aspect of the present invention, the motor may be provided wherein the shroud is adapted to at least one of to control exit area to match fan inlet area and to optimize exit locations where application might help with cooling.

According to another aspect of the present invention, the motor may be provided wherein the central portion of the motor housing defines a centrally located opening therethrough, the opening providing a fan inlet for the fan.

According to another aspect of the present invention, the motor may be provided wherein the radially extending portion of the motor housing defines a fan outlet thereof.

According to another aspect of the present invention, the motor may be provided wherein the fan outlet includes a regulator for modifying air flow through the fan outlet.

According to another aspect of the present invention, the motor may be provided wherein the housing is adapted to regulate the amount of cooling going to the radially extending portion of the housing.

According to another aspect of the present invention, the motor may be provided wherein the housing and the fan is adapted to provide an air flow directed radially outwardly.

According to another aspect of the present invention, the motor may be provided wherein the housing and the fan is adapted to provide an air flow directed radially inwardly.

According to another aspect of the present invention, a method for cooling electrical components of a motor is provided. The method includes providing a housing with a central portion and a radially extending portion extending from the central portion; securing at least one heat generating electrical component to the radially extending portion of the housing; attaching a fan blade to the motor; and blowing air with the fan blade over the at least one heat generating electrical component.

According to another aspect of the present invention, a separate fan is powered by its own motor for generating an air flow and for directing that air flow on the heat generating electrical component.

According to another aspect of the present invention, a blower is provided. The blower includes a housing, an impeller rotatably secured to the housing, a blower motor and a fan. The blower motor has a motor housing with a central portion and a radially extending portion extending from the central portion, a stator secured to the central portion of the motor housing, a rotor rotatably secured to the central portion of the motor housing, and at least one heat generating electrical component secured to the radially extending portion of the motor housing. The fan is attached to the motor housing and is adapted to cool the at least one heat generating electrical component. The fan includes a blade and a fan motor.

According to another aspect of the present invention, the blower may be provided wherein the fan comprises a radial flow fan.

According to another aspect of the present invention, the blower may be provided wherein the fan comprises a forwardly curved fan.

According to another aspect of the present invention, the blower may be provided wherein the fan comprises a backwardly curved fan.

According to another aspect of the present invention, the blower may be provided wherein the fan comprises an axial flow fan.

According to another aspect of the present invention, the blower may further include a regulator for regulating a flow of air from the fan toward the component.

According to another aspect of the present invention, the blower may further include a second radially extending portion extending from the central portion and spaced from the first mentioned radially extending portion.

According to another aspect of the present invention, the blower may further include a shroud positioned in the flow of air from the fan toward the component.

According to another aspect of the present invention, the blower may be provided wherein the shroud is adapted to at least one of to control exit area to match fan inlet area and to optimize are exits to locations where application might help with cooling.

According to another aspect of the present invention, the blower may be provided wherein the central portion of the motor housing defines a centrally located opening therethrough, the opening providing a fan inlet for the fan.

According to another aspect of the present invention, the blower may be provided wherein the radially extending portion of the motor housing defines a fan outlet thereof.

According to another aspect of the present invention, the blower may be provided wherein the fan outlet includes a regulator for modifying air flow through the fan outlet.

According to another aspect of the present invention, the blower may be provided wherein the motor housing is adapted to regulate the amount of cooling going to the radially extending portion of the motor housing.

According to another aspect of the present invention, the blower may be provided wherein the motor housing and the fan is adapted to provide an air flow directed radially outwardly.

According to another aspect of the present invention, the blower may be provided wherein the motor housing and the fan is adapted to provide an air flow directed radially inwardly.

According to another aspect of the present invention, a motor is provided. The motor includes a housing with a central portion and a radially extending portion extending from the central portion and a stator secured to the central portion of the housing. The motor also includes a rotor rotatably secured to the central portion of the housing, at least one heat generating electrical component secured to the radially extending portion of the housing, and a fan. The fan is attached to the motor and is adapted to cool the at least one heat generating electrical component. The fan includes a blade and a fan motor.

According to another aspect of the present invention, the motor may be provided wherein the fan comprises a radial flow fan.

According to another aspect of the present invention, the motor may be provided wherein the fan comprises a forwardly curved fan.

According to another aspect of the present invention, the motor may be provided wherein the fan comprises a backwardly curved fan.

According to another aspect of the present invention, the motor may be provided wherein the fan comprises an axial flow fan.

According to another aspect of the present invention, the motor may further include a regulator for regulating a flow of air from the fan toward the component.

According to another aspect of the present invention, the motor may further include a second radially extending portion extending from the central portion and spaced from the first mentioned radially extending portion.

According to another aspect of the present invention, the motor may further include a shroud positioned in the flow of air from the fan toward the component.

According to another aspect of the present invention, the motor may be provided wherein the shroud is adapted to at least one of to control exit area to match fan inlet area and to optimize are exits to locations where application might help with cooling.

According to another aspect of the present invention, the motor may be provided wherein the central portion of the motor housing defines a centrally located opening therethrough, the opening providing a fan inlet for the fan.

According to another aspect of the present invention, the motor may be provided wherein the radially extending portion of the motor housing defines a fan outlet thereof.

According to another aspect of the present invention, the motor may be provided wherein the fan outlet includes a regulator for modifying air flow through the fan outlet.

According to another aspect of the present invention, the motor may be provided wherein the motor housing is adapted to regulate the amount of cooling going to the radially extending portion of the motor housing.

According to another aspect of the present invention, the motor may be provided wherein the motor housing and the fan is adapted to provide an air flow directed radially outwardly.

According to another aspect of the present invention, the motor may be provided wherein the motor housing and the fan is adapted to provide an air flow directed radially inwardly.

According to another aspect of the present invention, a method for cooling electrical components of a blower motor is provided. The method includes providing a housing with a central portion and a radially extending portion extending from the central portion; securing at least one heat generating electrical component to the radially extending portion of the housing; attaching a fan having a fan motor to the blower motor; and blowing air with the fan blade over the at least one heat generating electrical component.

According to another aspect of the present invention, an integral fan is attached to or is a part of the rotor for generating an air flow and directing that air flow on the heat generating electrical component.

According to another aspect of the present invention, a blower may be provided. The blower may include a housing, an impeller rotatably secured to the housing, and an electric motor. The electric motor has a motor housing with a central portion and a radially extending portion extending from the central portion, a stator secured to the central portion of the motor housing, a rotor rotatably secured to the central portion of the housing, at least one heat generating electrical component secured to the radially extending portion of the motor housing, and a fan attached to the rotor and adapted to cool the at least one heat generating electrical component.

According to another aspect of the present invention, the blower may be provided wherein the fan includes a radial flow fan or a forwardly curved fan.

According to another aspect of the present invention, the blower may be provided wherein the fan comprises a backwardly curved fan.

According to another aspect of the present invention, the blower may be provided wherein the fan comprises an axial flow fan.

According to another aspect of the present invention, the blower may further include a regulator for regulating a flow of air from the fan toward the component.

According to another aspect of the present invention, the blower may further include a second radially extending portion extending from the central portion and spaced from the first mentioned radially extending portion.

According to another aspect of the present invention, the blower may further include a shroud positioned in the flow of air from the fan toward the component.

According to another aspect of the present invention, the blower may be provided wherein the shroud is adapted to at least one of to control exit area to match fan inlet area and to optimize are exits to locations where application might help with cooling.

According to another aspect of the present invention, the blower may be provided wherein the central portion of the motor housing defines a centrally located opening therethrough, the opening providing a fan inlet for the fan.

According to another aspect of the present invention, the blower may be provided wherein the radially extending portion of the motor housing defines a fan outlet thereof.

According to another aspect of the present invention, the blower may be provided wherein the fan outlet includes a regulator for modifying air flow through the fan outlet.

According to another aspect of the present invention, the blower may be provided wherein the motor housing is adapted to regulate the amount of cooling going to the radially extending portion of the motor housing.

According to another aspect of the present invention, the blower may be provided wherein the motor housing and the fan is adapted to provide an air flow directed radially outwardly.

According to another aspect of the present invention, the blower may be provided wherein the motor housing and the fan is adapted to provide an air flow directed radially inwardly.

According to another aspect of the present invention, the blower may be provided wherein the rotor is hollow and defines a central opening therethrough, the opening adapted to provide an air flow therethrough.

According to another aspect of the present invention, the blower may be provided wherein the fan is one of formed in the rotor or attached thereto.

According to another aspect of the present invention, a motor may be provided. The motor includes a housing with a central portion and a radially extending portion extending from the central portion, a stator secured to the central portion of the housing, a rotor rotatably secured to the central portion of the housing, at least one heat generating electrical component secured to the radially extending portion of the housing, and a fan. The fan is attached to the rotor and is adapted to cool the at least one heat generating electrical component.

According to another aspect of the present invention, the motor may be provided wherein the fan comprises a radial flow fan.

According to another aspect of the present invention, the motor may be provided wherein the fan comprises a forwardly curved fan.

According to another aspect of the present invention, the motor may be provided wherein the fan comprises a backwardly curved fan.

According to another aspect of the present invention, the motor may be provided wherein the fan comprises an axial flow fan.

According to another aspect of the present invention, the motor may include a regulator for regulating a flow of air from the fan toward the component.

According to another aspect of the present invention, the motor may include a second radially extending portion extending from the central portion and spaced from the first mentioned radially extending portion.

According to another aspect of the present invention, the motor may further include a shroud positioned in the flow of air from the fan toward the component.

According to another aspect of the present invention, the motor may be provided wherein the shroud is adapted to at least one of to control exit area to match fan inlet area and to optimize are exits to locations where application might help with cooling.

According to another aspect of the present invention, the motor may be provided wherein the central portion of the motor housing defines a centrally located opening therethrough, the opening providing a fan inlet for the fan.

According to another aspect of the present invention, the motor may be provided wherein the radially extending portion of the motor housing defines a fan outlet thereof.

According to another aspect of the present invention, the motor may be provided wherein the fan outlet includes a regulator for modifying air flow through the fan outlet.

According to another aspect of the present invention, the motor may be provided wherein the motor housing is adapted to regulate the amount of cooling going to the radially extending portion of the motor housing.

According to another aspect of the present invention, the motor may be provided wherein the motor housing and the fan is adapted to provide an air flow directed radially outwardly.

According to another aspect of the present invention, the motor may be provided wherein the motor housing and the fan is adapted to provide an air flow directed radially inwardly.

According to another aspect of the present invention, the motor may be provided wherein the rotor is hollow and defines a central opening therethrough, the opening adapted to provide an air flow therethrough.

According to another aspect of the present invention, the motor may be provided wherein the fan is one of formed in the rotor or attached thereto.

According to another aspect of the present invention, a method for cooling electrical components of a motor is provided. The method includes providing a housing with a central portion and a radially extending portion extending from the central portion; securing at least one heat generating electrical component to the radially extending portion of the housing; providing a rotor rotatable secured to the housing; attaching a fan blade to the rotor; and blowing air with the fan blade over the at least one heat generating electrical component.

According to another aspect of the present invention, a fully circular plenum may be used to generate an air flow and to direct that air flow on the heat generating electrical component.

According to another aspect of the present invention, a blower is provided. The blower includes a housing, an impeller rotatably secured to the housing, an electric motor and a plenum. The electric motor has a motor housing with a central portion and a radially extending portion extending from the central portion, a stator secured to the central portion of the motor housing, a rotor rotatably secured to the central portion of the housing, and at least one heat generating electrical component secured to the radially extending portion of the motor housing. The plenum is attached to the motor and is adapted to cool the at least one heat generating electrical component.

According to another aspect of the present invention, the blower may further include a regulator for regulating a flow of air from the plenum toward the component.

According to another aspect of the present invention, the blower may further include a second radially extending portion extending from the central portion and spaced from the first mentioned radially extending portion.

According to another aspect of the present invention, the blower may further include a shroud positioned in the flow of air from the plenum toward the component.

According to another aspect of the present invention, the blower may be provided wherein the shroud is adapted to at least one of to control exit area to match fan inlet area and to optimize are exits to locations where application might help with cooling.

According to another aspect of the present invention, the blower may be provided wherein the central portion of the motor housing defines a centrally located opening therethrough, the opening providing an inlet for the plenum.

According to another aspect of the present invention, the blower may be provided wherein the radially extending portion of the motor housing defines a plenum outlet thereof.

According to another aspect of the present invention, the blower may be provided wherein the fan outlet includes a regulator for modifying air flow through the plenum outlet.

According to another aspect of the present invention, the blower may be provided wherein the motor housing is adapted to regulate the amount of cooling going to the radially extending portion of the motor housing.

According to another aspect of the present invention, the blower may be provided wherein the motor housing and the plenum are adapted to provide an air flow directed radially outwardly.

According to another aspect of the present invention, the blower may be provided wherein the motor housing and the plenum are adapted to provide an air flow directed radially inwardly.

According to another aspect of the present invention, a motor is provided. The motor includes a housing with a central portion and a radially extending portion extending from the central portion; a stator secured to the central portion of the housing; a rotor rotatably secured to the central portion of the housing; at least one heat generating electrical component secured to the radially extending portion of the housing; and a plenum attached to the housing and adapted to cool the at least one heat generating electrical component.

According to another aspect of the present invention, the motor further includes a regulator for regulating a flow of air from the plenum toward the component.

According to another aspect of the present invention, the motor further includes a second radially extending portion extending from the central portion and spaced from the first mentioned radially extending portion.

According to another aspect of the present invention, the motor further includes a shroud positioned in the flow of air from the plenum toward the component.

According to another aspect of the present invention, the motor may be provided wherein the shroud is adapted to at least one of to control exit area to match fan inlet area and to optimize are exits to locations where application might help with cooling.

According to another aspect of the present invention, the motor may be provided wherein the central portion of the motor housing defines a centrally located opening therethrough, the opening providing an inlet for the plenum.

According to another aspect of the present invention, the motor may be provided wherein the radially extending portion of the motor housing defines a plenum outlet thereof.

According to another aspect of the present invention, the motor may be provided wherein the fan outlet includes a regulator for modifying air flow through the plenum outlet.

According to another aspect of the present invention, the motor may be provided wherein the motor housing is adapted to regulate the amount of cooling going to the radially extending portion of the motor housing.

According to another aspect of the present invention, the motor may be provided wherein the motor housing and the plenum are adapted to provide an air flow directed radially outwardly.

According to another aspect of the present invention, the motor may be provided wherein the motor housing and the plenum are adapted to provide an air flow directed radially inwardly.

According to another aspect of the present invention, a method for cooling electrical components of a motor may be provided. The method includes providing a housing with a central portion and a radially extending portion extending from the central portion; securing at least one heat generating electrical component to the radially extending portion of the housing; attaching a plenum to the housing; and blowing air with the plenum over the at least one heat generating electrical component.

According to another aspect of the present invention, a fan (blades) is attached to or becomes a part of the impeller for generating an air flow and directing that air flow on the heat generating electrical component.

According to another aspect of the present invention, a blower may be provided. The blower includes a housing, an impeller rotatably secured to the housing, and an electric motor. The electric motor has a motor housing with a central portion and a radially extending portion extending from the central portion, a stator secured to the central portion of the motor housing, a rotor rotatably secured to the central portion of the housing, and at least one heat generating electrical component secured to the radially extending portion of the motor housing. The impeller includes a blade adapted to cool the at least one heat generating electrical component.

According to another aspect of the present invention, the blower may be provided wherein the blade comprises a radial flow blade.

According to another aspect of the present invention, the motor may be provided wherein the blade comprises a forwardly curved blade.

According to another aspect of the present invention, the blower may be provided wherein the blade comprises a backwardly curved blade.

According to another aspect of the present invention, the blower may be provided wherein the blade comprises an axial flow blade.

According to another aspect of the present invention, the blower may further include a regulator for regulating a flow of air from the blade toward the component.

According to another aspect of the present invention, the blower may further include a second radially extending portion extending from the central portion and spaced from the first mentioned radially extending portion.

According to another aspect of the present invention, the blower may further include a shroud positioned in the flow of air from the blade toward the component.

According to another aspect of the present invention, the blower may be provided wherein the shroud is adapted to at least one of to control exit area to match blade inlet area and to optimize are exits to locations where application might help with cooling.

According to another aspect of the present invention, the blower may be provided wherein the central portion of the motor housing defines a centrally located opening therethrough, the opening providing an inlet for the blade.

According to another aspect of the present invention, the blower may be provided wherein the radially extending portion of the motor housing defines a blade outlet thereof.

According to another aspect of the present invention, the blower may be provided wherein the blade outlet includes a regulator for modifying air flow through the fan outlet.

According to another aspect of the present invention, the blower may be provided wherein the motor housing is adapted to regulate the amount of cooling going to the radially extending portion of the motor housing.

According to another aspect of the present invention, the blower may be provided wherein the motor housing and the impeller are adapted to provide an air flow directed radially outwardly.

According to another aspect of the present invention, the blower may be provided wherein the motor housing and the impeller are adapted to provide an air flow directed radially inwardly.

According to another aspect of the present invention, a motor for use with impeller having a motor cooling blade may be provided. The motor is used to rotate the impeller and the blade. The motor includes a housing with a central portion and a radially extending portion extending from the central portion; a stator secured to the central portion of the housing; a rotor rotatably secured to the central portion of the housing; and at least one heat generating electrical component secured to the radially extending portion of the housing. The motor is adapted for use with the blade of the impeller such that the blade of the impeller may be used to cool the at least one heat generating electrical component.

According to another aspect of the present invention, the blower may further include a regulator for regulating a flow of air from the blade toward the component.

According to another aspect of the present invention, the blower may further include a second radially extending portion extending from the central portion and spaced from the first mentioned radially extending portion.

According to another aspect of the present invention, the blower may further include a shroud positioned in the flow of air from the blade toward the component.

According to another aspect of the present invention, the blower may be provided wherein the shroud is adapted to at least one of to control exit area to match impeller inlet area and to optimize are exits to locations where application might help with cooling.

According to another aspect of the present invention, the blower may be provided wherein the central portion of the motor housing defines a centrally located opening therethrough, the opening providing an impeller inlet for the impeller.

According to another aspect of the present invention, the blower may be provided wherein the radially extending portion of the motor housing defines a impeller outlet thereof.

According to another aspect of the present invention, the blower may be provided wherein the impeller outlet includes a regulator for modifying air flow through the fan outlet.

According to another aspect of the present invention, the blower may be provided wherein the motor housing is adapted to regulate the amount of cooling going to the radially extending portion of the motor housing.

According to another aspect of the present invention, the blower may be provided wherein the motor housing and the impeller are adapted to provide an air flow directed radially outwardly.

According to another aspect of the present invention, the blower may be provided wherein the motor housing and the impeller are adapted to provide an air flow directed radially inwardly.

According to another aspect of the present invention, a method for cooling electrical components of a motor with a blade of an impeller of a blower rotated by the motor may be provided. The method includes providing a housing with a central portion and a radially extending portion extending from the central portion; securing at least one heat generating electrical component to the radially extending portion of the housing; and positioning the motor relative to the impeller such that blowing air from the blade of the impeller passes over the at least one heat generating electrical component.

According to another aspect of the present invention, the blower may be provided with a feature that uses the difference in air pressure between the impeller chamber of the blower and the motor chamber of the motor to generate an air flow and to direct that air flow on the heat generating electrical component.

According to another aspect of the present invention, a blower may be provided. The blower includes an impeller housing; an impeller rotatably secured to the housing; and an electric motor. The electric motors has a motor housing with a central portion and a radially extending portion extending from the central portion, a stator secured to the central portion of the motor housing, a rotor rotatably secured to the central portion of the housing, and at least one heat generating electrical component secured to the radially extending portion of the motor housing. The impeller housing has a first air pressure therein and the motor housing has a second air pressure therein different that the first air pressure, The impeller housing and the motor housing define a passageway therebetween whereby the difference in air pressure generates air flow within the motor housing to cool the at least one heat generating electrical component.

According to another aspect of the present invention, the blower may further include a regulator for regulating a flow of air from the impeller housing toward the component.

According to another aspect of the present invention, the blower may further include a second radially extending portion extending from the central portion and spaced from the first mentioned radially extending portion.

According to another aspect of the present invention, the blower may further include a shroud positioned in the flow of air from the impeller housing toward the component.

According to another aspect of the present invention, the blower may be provided wherein the shroud is adapted to at least one of to control exit area to match air inlet area and to optimize area exits to locations where application might help with cooling.

According to another aspect of the present invention, the blower may be provided wherein the impeller housing and the motor housing are adjoined to each other and wherein the impeller housing defines an opening therethrough and wherein the motor housing defines an opening therethrough, whereby the opening of the impeller housing and are the opening of the motor housing are aligned to permit air blow form the impeller housing to the motor housing.

According to another aspect of the present invention, the blower may be provided wherein the radially extending portion of the motor housing defines an air outlet thereof.

According to another aspect of the present invention, the blower may be provided wherein the motor housing includes a regulator for modifying air flow through the motor housing.

According to another aspect of the present invention, the blower may be provided wherein the motor housing is adapted to regulate the amount of cooling going to the radially extending portion of the motor housing.

According to another aspect of the present invention, the blower may be provided wherein the motor housing and the impeller housing are adapted to provide an air flow directed radially outwardly.

According to another aspect of the present invention, the blower may be provided wherein the motor housing and the impeller housing are adapted to provide an air flow directed radially inwardly.

According to another aspect of the present invention a motor for use in rotating an impeller in an impeller housing of a blower may be provided. The motor includes a motor housing with a central portion and a radially extending portion extending from the central portion; a stator secured to the central portion of the housing; a rotor rotatably secured to the central portion of the housing; and at least one heat generating electrical component secured to the radially extending portion of the housing. The impeller housing has a first air pressure therein and the motor housing has a second air pressure therein different that the first air pressure. The impeller housing and the motor housing define a passageway therebetween whereby the difference in air pressure generates air flow within the motor housing to cool the at least one heat generating electrical component.

According to another aspect of the present invention, the motor may further include a regulator for regulating a flow of air from the impeller housing toward the component.

According to another aspect of the present invention, the motor may further include a second radially extending portion extending from the central portion and spaced from the first mentioned radially extending portion.

According to another aspect of the present invention, the motor may further include a shroud positioned in the flow of air from the impeller housing toward the component.

According to another aspect of the present invention, the motor may be provided wherein the shroud is adapted to at least one of to control exit area to match air inlet area and to optimize are exits to locations where application might help with cooling.

According to another aspect of the present invention, the motor may be provided wherein the impeller housing and the motor housing are adjoined to each other and wherein the impeller housing defines an opening therethrough and wherein the motor housing defines an opening therethrough, whereby the opening of the impeller housing and the opening of the motor housing are aligned to permit air blow form the impeller housing to the motor housing.

According to another aspect of the present invention, the motor may be provided wherein the radially extending portion of the motor housing defines an air outlet thereof.

According to another aspect of the present invention, the motor may be provided wherein the motor housing includes a regulator for modifying air flow through the motor housing.

According to another aspect of the present invention, the motor may be provided wherein the motor housing is adapted to regulate the amount of cooling going to the radially extending portion of the motor housing.

According to another aspect of the present invention, the motor may be provided wherein the motor housing and the impeller housing are adapted to provide an air flow directed radially outwardly.

According to another aspect of the present invention, the motor may be provided wherein the motor housing and the impeller housing are adapted to provide an air flow directed radially inwardly.

According to another aspect of the present invention, a method for cooling electrical components of a motor used to rotate an impeller in a blower may be provided. The method includes providing an impeller housing for rotably securing the impeller; subjecting the impeller housing to a first pressure; providing a motor housing with a central portion and a radially extending portion extending from the central portion; securing at least one heat generating electrical component to the radially extending portion of the housing; subjecting the motor housing to a second pressure, different than the first pressure; and utilizing the pressure difference to obtain an airflow from one of the impeller housing and the motor housing to the other of the impeller housing and the motor housing to cool the at least one heat generating electrical.

According to another aspect of the present invention, a venturi chamber is provided next to the motor housing and opposed to impeller housing and the difference in air pressure between the venturi chamber of the blower and the motor chamber of the motor is used to generate an air flow and to direct that air flow onto the heat generating electrical component.

According to another aspect of the present invention, a blower may be provided. The blower includes an impeller housing; an impeller rotatably secured to the housing; and an electric motor. The electric motor has a motor housing with a central portion and a radially extending portion extending from the central portion, a venturi chamber adjacent the motor housing and opposed to the impeller housing, a stator secured to the central portion of the motor housing, a rotor rotatably secured to the central portion of the housing, and at least one heat generating electrical component secured to the radially extending portion of the motor housing. The impeller housing has a first air pressure therein and the motor housing has a second air pressure therein different that the first air pressure. The venturi housing and the motor housing define a passageway therebetween whereby the difference in air pressure generates air flow within the motor housing to cool the at least one heat generating electrical component.

According to another aspect of the present invention, the blower may further include a regulator for regulating a flow of air from the impeller housing toward the component.

According to another aspect of the present invention, the blower may further include a second radially extending portion extending from the central portion and spaced from the first mentioned radially extending portion.

According to another aspect of the present invention, the blower may further include a shroud positioned in the flow of air from the venturi housing toward the component.

According to another aspect of the present invention, the blower may be provided wherein the shroud is adapted to at least one of to control exit area to match air inlet area and to optimize area exits to locations where application might help with cooling.

According to another aspect of the present invention, the blower may be provided wherein the venturi housing and the motor housing are adjoined to each other and wherein the impeller housing defines an opening therethrough and wherein the motor housing defines an opening therethrough, whereby the opening of the venturi housing and are the opening of the motor housing are aligned to permit air blow form the impeller housing to the motor housing.

According to another aspect of the present invention, the blower may be provided wherein the radially extending portion of the motor housing defines an air outlet thereof.

According to another aspect of the present invention, the blower may be provided wherein the motor housing includes a regulator for modifying air flow through the motor housing.

According to another aspect of the present invention, the blower may be provided wherein the motor housing is adapted to regulate the amount of cooling going to the radially extending portion of the motor housing.

According to another aspect of the present invention, the blower may be provided wherein the motor housing and the venturi housing are adapted to provide an air flow directed radially outwardly.

According to another aspect of the present invention, the blower may be provided wherein the motor housing and the venturi housing are adapted to provide an air flow directed radially inwardly.

According to another aspect of the present invention, a motor for using in rotating an impeller in an impeller housing of a blower may be provided. The motor includes a motor housing with a central portion and a radially extending portion extending from the central portion; a stator secured to the central portion of the housing; a rotor rotatably secured to the central portion of the housing; a venturi chamber adjacent the motor housing and opposed to the impeller housing; and at least one heat generating electrical component secured to the radially extending portion of the housing. The venturi housing has a first air pressure therein and the motor housing has a second air pressure therein different that the first air pressure. The venturi housing and the motor housing define a passageway therebetween whereby the difference in air pressure generates air flow within the motor housing to cool the at least one heat generating electrical component.

According to another aspect of the present invention, the motor may further include a regulator for regulating a flow of air from the venturi housing toward the component.

According to another aspect of the present invention, the motor may further include a second radially extending portion extending from the central portion and spaced from the first mentioned radially extending portion.

According to another aspect of the present invention, the motor may further include a shroud positioned in the flow of air from the venturi housing toward the component.

According to another aspect of the present invention, the motor may be provided wherein the shroud is adapted to at least one of to control exit area to match air inlet area and to optimize area exits to locations where application might help with cooling.

According to another aspect of the present invention, the motor may be provided wherein the venturi housing and the motor housing are adjoined to each other and wherein the venturi housing defines an opening therethrough and wherein the motor housing defines an opening therethrough, whereby the opening of the venturi housing and the opening of the motor housing are aligned to permit air blow form the impeller housing to the motor housing.

According to another aspect of the present invention, the motor may be provided wherein the radially extending portion of the motor housing defines an air outlet thereof.

According to another aspect of the present invention, the motor may be provided wherein the motor housing includes a regulator for modifying air flow through the motor housing.

According to another aspect of the present invention, the motor may be provided wherein the motor housing is adapted to regulate the amount of cooling going to the radially extending portion of the motor housing.

According to another aspect of the present invention, the motor may be provided wherein the motor housing and the venturi housing are adapted to provide an air flow directed radially outwardly.

According to another aspect of the present invention, the motor may be provided wherein the motor housing and the venturi housing are adapted to provide an air flow directed radially inwardly.

According to another aspect of the present invention, a method for cooling electrical components of a motor used to rotate an impeller in a blower may be provided. The method includes providing a motor housing with a central portion and a radially extending portion extending from the central portion; securing at least one heat generating electrical component to the radially extending portion of the housing; subjecting the motor housing to a first pressure providing a venturi housing positioning the venturi housing adjacent the motor housing; subjecting the venturi housing to a second pressure, different from the first pressure; and utilizing the pressure difference to obtain an airflow from one of the impeller housing and the motor housing to the other of the impeller housing and the motor housing to cool the said at least one heat generating electrical component.

According to another aspect of the present invention, cooling devices may be placed on the mounting arms of the motor/blower and may be used to transfer the cooling effect of the devices through the arms to the electrical component.

According to another aspect of the present invention, a blower may be provided. The blower may include a housing. The housing has a motor housing central portion and a radially extending motor portion extending from the central portion. The blower may also include an impeller rotatably secured to the housing and an electric motor. The electric motor has a stator secured to the central portion, a rotor rotatably secured to the central portion, at least one heat generating electrical component secured to the radially extending motor portion, a plurality of mounting arms connected to the housing, and a cooling device connected to at least one of the arms. The cooling device and the housing are adapted to cool the at least one heat generating electrical component.

According to another aspect of the present invention, the blower may further include a regulator for regulating a flow of air from the housing toward the component.

According to another aspect of the present invention, the blower may further include a second radially extending portion extending from the central portion and spaced from the first mentioned radially extending portion.

According to another aspect of the present invention, the blower may further include a shroud positioned in the flow of air from the housing toward the component.

According to another aspect of the present invention, the blower may be provided wherein the shroud is adapted to at least one of to control exit area to match air inlet area and to optimize area exits to locations where application might help with cooling.

According to another aspect of the present invention, the blower may further include an electrical conduit box positioned on one of the arms.

According to another aspect of the present invention, the blower may be provided wherein the cooling device comprises an inverter pod.

According to another aspect of the present invention, the blower may be provided wherein the inverter pod is positioned on one of the arms.

According to another aspect of the present invention, the blower may be provided wherein the cooling device comprises a heat pipe.

According to another aspect of the present invention, the blower may be provided wherein the heat pipe is positioned on one of the arms.

According to another aspect of the present invention, the blower may be provided wherein the cooling device comprises a cooling deflector.

According to another aspect of the present invention, the blower may be provided wherein the cooling deflector is positioned on one of the arms.

According to another aspect of the present invention, the blower may be provided wherein the radially extending portion of the motor housing defines an air outlet thereof.

According to another aspect of the present invention, the blower may be provided wherein the housing includes a regulator for modifying air flow through the housing.

According to another aspect of the present invention, the blower may be provided wherein the housing is adapted to regulate the amount of cooling going to the radially extending portion of the housing.

According to another aspect of the present invention, the blower may be provided wherein the housing is adapted to provide an air flow directed radially outwardly.

According to another aspect of the present invention, the blower may be provided wherein the housing is adapted to provide an air flow directed radially inwardly.

According to another aspect of the present invention, a motor for use in a blower may be provided. The motor includes a housing. The housing has a motor housing central portion and a radially extending motor portion extending from the central portion. The motor also includes a stator secured to the central portion, a rotor rotatably secured to the central portion, at least one heat generating electrical component secured to the radially extending motor portion; a plurality of mounting arms connected to the housing; and a cooling device connected to at least one of the arms. The cooling device and the housing are adapted to cool the at least one heat generating electrical component.

According to another aspect of the present invention, the blower may further include a regulator for regulating a flow of air from the housing toward the component.

According to another aspect of the present invention, the blower may further include a second radially extending portion extending from the central portion and spaced from the first mentioned radially extending portion.

According to another aspect of the present invention, the blower may further include a shroud positioned in the flow of air from the housing toward the component.

According to another aspect of the present invention, the motor may be provided wherein the shroud is adapted to at least one of to control exit area to match air inlet area and to optimize area exits to locations where application might help with cooling.

According to another aspect of the present invention, the motor further include an electrical conduit box positioned on one of the arms.

According to another aspect of the present invention, the motor may be provided wherein the cooling device comprises an inverter pod.

According to another aspect of the present invention, the motor may be provided wherein the inverter pod is positioned on one of the arms.

According to another aspect of the present invention, the motor may be provided wherein the cooling device comprises a heat pipe.

According to another aspect of the present invention, the motor may be provided wherein the heat pipe is positioned on one of the arms.

According to another aspect of the present invention, the motor may be provided wherein the cooling device comprises a cooling deflector.

According to another aspect of the present invention, the motor may be provided wherein the cooling deflector is positioned on one of the arms.

According to another aspect of the present invention, the motor may be provided wherein the radially extending portion of the motor housing defines an air outlet thereof.

According to another aspect of the present invention, the motor may be provided wherein the housing includes a regulator for modifying air flow through the housing.

According to another aspect of the present invention, the motor may be provided wherein the housing is adapted to regulate the amount of cooling going to the radially extending portion of the housing.

According to another aspect of the present invention, the motor may be provided wherein the housing is adapted to provide an air flow directed radially outwardly.

According to another aspect of the present invention, the motor may be provided wherein the housing is adapted to provide an air flow directed radially inwardly.

According to another aspect of the present invention, a method for cooling electrical components of a motor used in a blower may be provided. The method includes providing a housing with a central portion and a radially extending portion extending from the central portion; securing at least one heat generating electrical component to the radially extending portion of the housing; attaching at least one arm to the housing; attaching a cooling device to the at least one arm; and utilizing the cooling device to cool the said at least one heat generating electrical component.

DETAILED DESCRIPTION OF THE INVENTION

Figure 1:
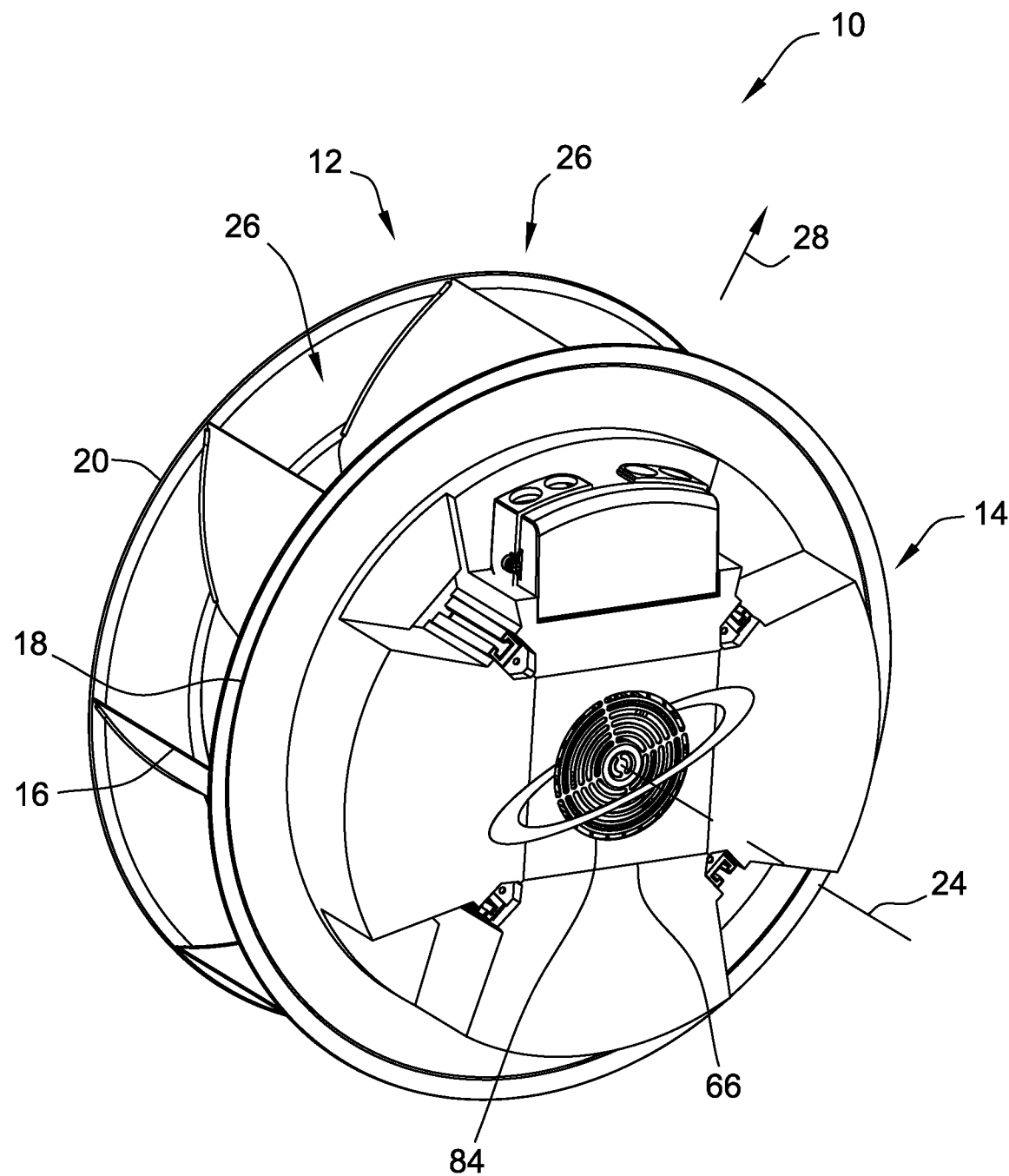
FIG. 1 is a perspective view of a blower, according to an embodiment of the present invention.

Many of the known commercial heating, ventilation, and air conditioning (HVAC) systems require air propulsion units. In addition to providing movement of air for HVAC systems, air propulsion units may be used in combination with condenser units and to supplement other heat transfer operations. Some known air propulsion units include motor driven fans. These fans include, for example, a centrifugal impeller type fan driven by a radial flux motor. However, some known radial flux motors and their mounting components extend a certain distance into the fan cavity. This restricts air flow through the fan and yields aerodynamic losses that adversely affect fan performance.

Moving the air propulsion unit outside of the fan cavity causes an overall thickness of the assembly to increase significantly and further requires that the fan be attached to a shaft of the motor using various coupling mechanisms attached to the fan. These known coupling mechanisms further add to the fan assembly thickness and introduce weight and complexity to the fan assembly. Furthermore, the cost is increased in such fan assemblies due to the increased part count required for coupling the fan to the motor shaft.

In addition, many known air propulsion units include an integrated controller attached to an end of the unit, thereby further increasing the thickness of the fan assembly. To reduce the thickness of the air propulsion unit, many known units include complex controller board arrangements and layout that can add cost and complexity to the unit, and introduce localized heating from the heat generating components that is not adequately dissipated.

Further, localized heating of the heat generating components provide challenges to efficiently and effectively cooling those heat generating components while minimizing the power and air flow losses required to provide such cooling.

Referring to FIGS. 1-4 a schematic perspective of an exemplary fluid circulating assembly in the form of a blower 10 is shown. In the exemplary embodiment, fluid circulating assembly 10 generates a flow of air in a forced air system, for example, without limitation, a residential or commercial heating, ventilation, and air conditioning (HVAC) system. Alternatively, fluid circulating assembly 10 generates a fluid flow in any type of fluid circulating system that enables fluid circulating assembly 10 to function as described herein. In the exemplary embodiment, fluid circulating assembly 10 includes a fan impeller 12 coupled to an electrical machine 14. In the exemplary embodiment, electrical machine 14 is an electric motor, and more specifically, an axial flux electric motor, although, electrical machine 14 may function as either an electric motor or an electric generator. Furthermore, fan impeller 12 is a centrifugal fan impeller, although, impeller 12 can be a pump impeller.

In the exemplary embodiment, fan impeller 12 includes a plurality of impeller blades 16 (blades). Blades 16 are attached between a rear plate 18 and an inlet ring 20 (or front plate). Inlet ring 20 includes a central air inlet 22. In the exemplary embodiment, fan impeller 12 is a backward curved plug fan. Alternatively, fan impeller 12 may have any suitable blade shape or configuration that enables fluid circulating assembly 10 to operate as described herein, for example, without limitation, a backward curved blade, an airfoil blade, a backward inclined blade, a forward curved blade, and a radial blade.

In the exemplary embodiment, rear plate 18 and inlet ring 20 are coaxial, or substantially coaxial, and rotate about a center axis 24. Blades 16 are attached to rear plate 18 and/or inlet ring 20 such that each blade 16 extends between rear plate 18 and inlet ring 20. In the exemplary embodiment, each blade 16 is attached to rear plate 18 and inlet ring 20 by mechanical bonding, such as welding. Alternatively, each blade 16 is attached to rear plate 18 and/or inlet ring 20 via mechanical fasteners, for example, without limitation, rivets, or via features formed in rear plate 18 and/or inlet ring 20 such as an opening, for example, without limitation, a groove or a slot configured to restrict an amount of movement of blade 16 between rear plate 18 and inlet ring 20 while enabling each blade 16 to operate as described herein.

In the exemplary embodiment, during operation, air enters fluid circulating assembly 10 substantially axially along center axis 24 through central air inlet 22 and is deflected radially outward toward blades 16. Blades 16 are configured to draw the air through inlet 22 into a central chamber 26 of fan impeller 12, i.e., blades 16 pull in air along center axis 24 and eject the air radially outward through central chamber 26, where each outlet channel 28 is located between adjacent blades 16. The air passes between blades 16 and is pushed outward through outlet channels 28 due to centrifugal force generated by the rotating blades 16. Blades 16 are suitably fabricated from any number of materials, including sheet metal, plastic, or a flexible or compliant material. Alternatively, blades 16 are fabricated from a combination of materials such as attaching a flexible or compliant material to a rigid material, or any suitable material or material combination that enables blades 16 to operate as described herein.

Figure 5:
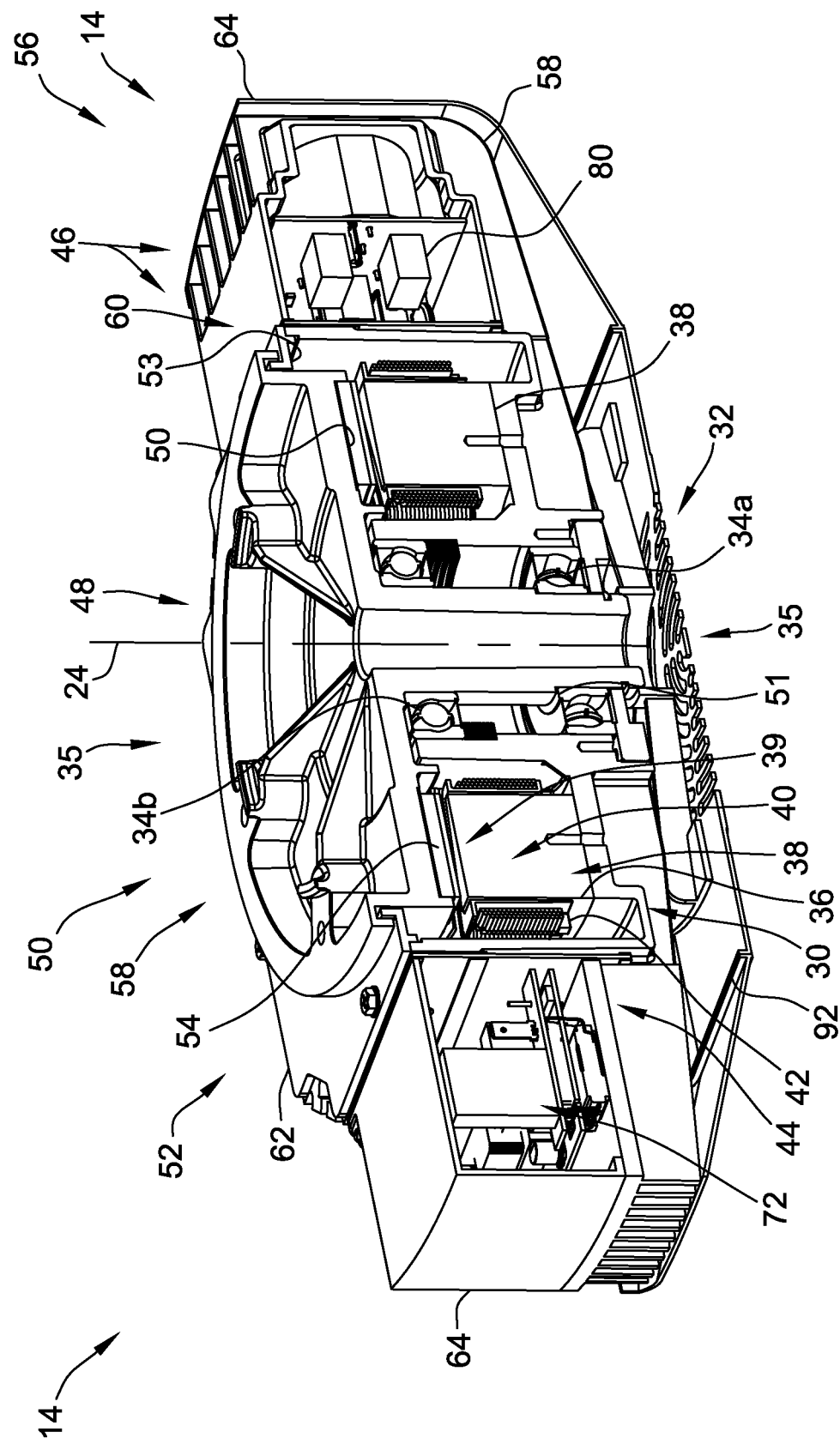
FIG. 5 is a cross-sectional view of the device of FIG. 2 along the line 5-5 in the direction of the arrows.
Figure 6:
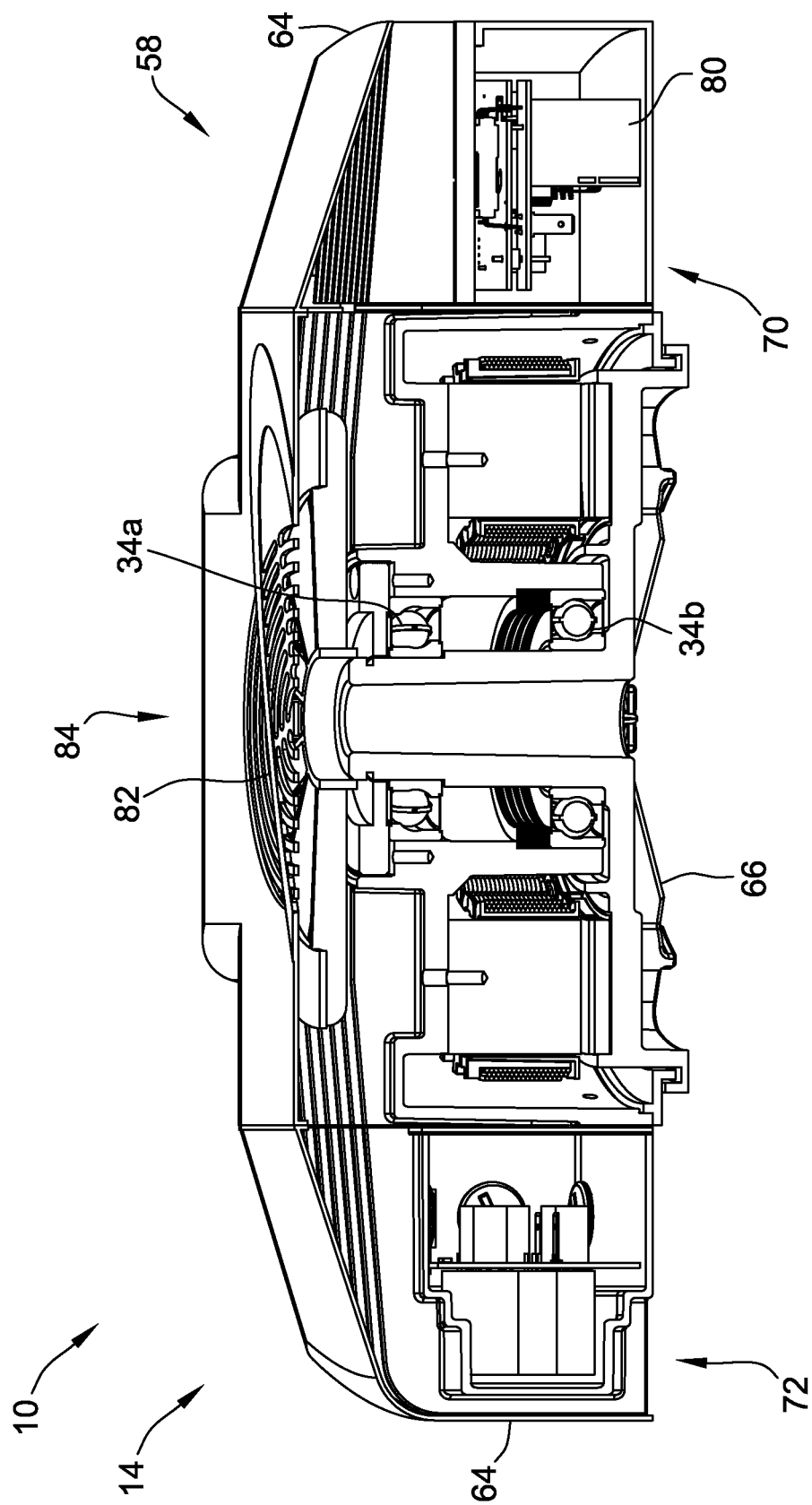
FIG. 6 is a cross-sectional view of the device of FIG. 3 along the line 6-6 in the direction of the arrows.
Figure 7:
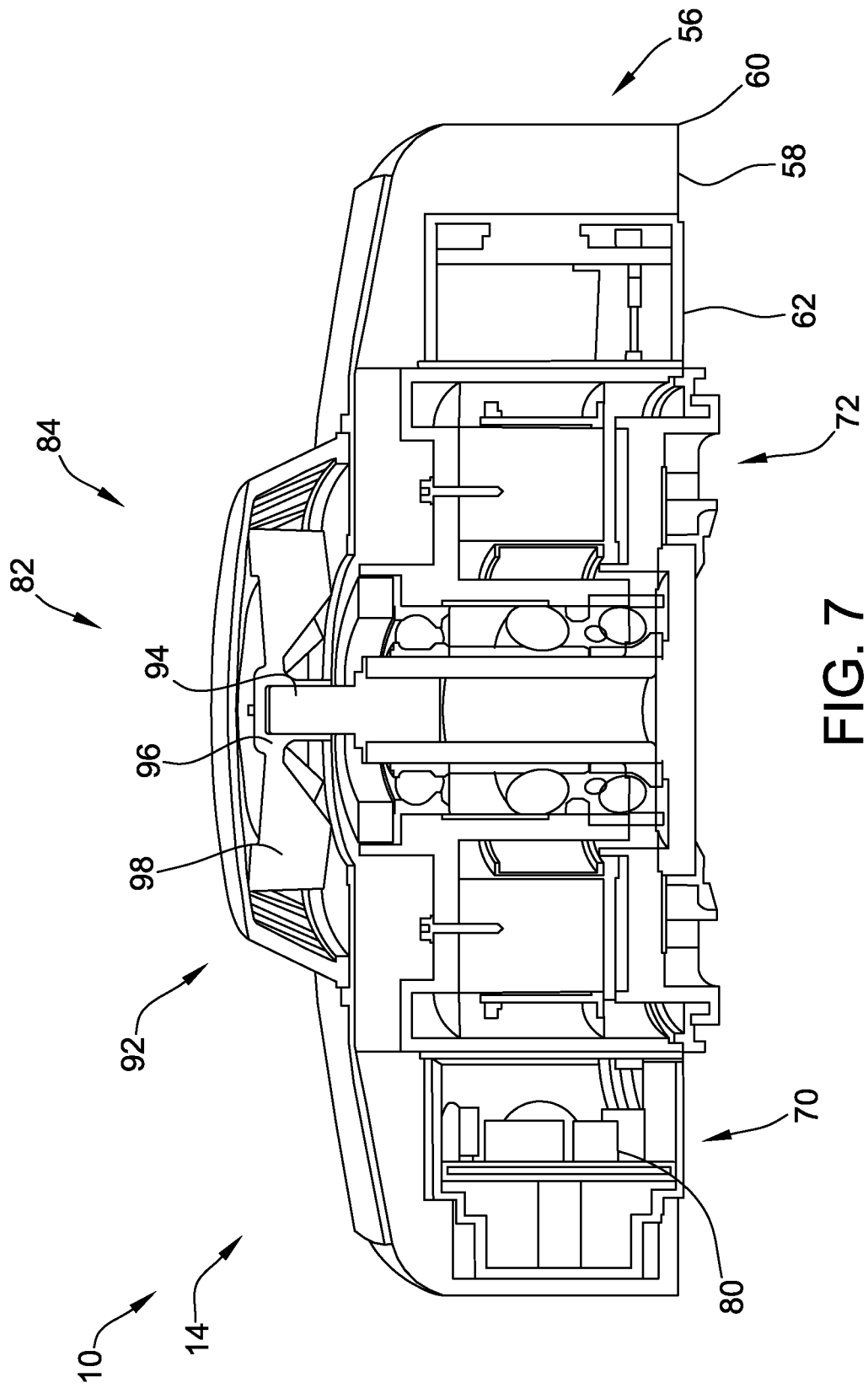
FIG. 7 is a cross-sectional view of the device of FIG. 4 along the line 6-6 in the direction of the arrows.

Referring now to FIGS. 5-7 the electric machine 14 is shown in greater detail. An enlarged view of a portion of FIG. 1 shows electrical machine 14 without fan impeller 12. In the exemplary embodiment, electrical machine 14 is an axial flux electric motor configured to rotate fan impeller 12 about center axis 24. Electrical machine 14 includes a stator assembly 30, a rotor assembly 32, and a pair of bearing assemblies 34a, 34b coupled radially therebetween. Stator assembly 30, rotor assembly 32, and bearing assemblies 34a, 34b are positioned concentrically, each including a central opening 35 oriented about center axis 24.

Stator assembly 30 includes a stator core 36 that includes a plurality of circumferentially-spaced stator teeth 38 that extend axially, substantially parallel to center axis 24. In the exemplary embodiment, stator core 36 is a laminated core. As defined herein, the laminated core is radially laminated, e.g., fabricated with a ribbon of material wound into a core, or a series of concentric rings stacked one inside the other to create a core of material, for example, soft iron or silicon steel. Alternatively, stator core 36 may be a solid core stator. A solid core can be a complete, one-piece component, or can include multiple non-laminated sections coupled together to form a complete solid core. Stator core 36 is fabricated from a magnetic material, such as, for example, a Soft Magnetic Alloy (SMA) or a Soft Magnetic Composite (SMC) material. Alternatively, stator core 36 is fabricated from any ferromagnetic material that enables electrical machine 14 to function as described herein, such as, for example, steel or a steel alloy. The use of SMA or SMC materials in a solid core enable 3-dimensional flux paths and facilitate reducing high frequency losses (e.g., losses at frequencies above 60 Hz) when compared with laminated stator cores. The use of SMC or SMA materials also facilitates increasing control of an air gap 39, which facilitates improving performance and minimizing noise.

Between each pair of adjacent stator teeth 38 is a slot 40. Each stator tooth 38 is configured to receive one of a plurality of insulating bobbins 42 that includes a copper winding 44 would around an outer surface of each respective bobbin 42. Alternatively, each stator tooth 38 includes copper winding 44 without bobbin 42. Electrical machine 14 can include one copper winding 44 per stator tooth 38 or one copper winding 44 positioned on every other stator tooth 38. Copper windings 44 are electrically coupled to a controller assembly 46 for receiving electrical current thereby inducing an electromagnetic field about a pole of stator core 36. Controller assembly 46 is configured to apply a voltage to one or more of copper windings 44 at a time for commutating copper windings 44 in a preselected sequence to rotate rotor assembly 32 about center axis 24. In the exemplary embodiment, electrical current is a three-phase alternating current (AC). Alternatively, the current is any type of electrical current that enables electrical machine 14 to function as described herein. In the exemplary embodiment, controller assembly 46 functions to both accelerate and decelerate rotor assembly 32.

In the exemplary embodiment, rotor assembly 32 includes a rotor disk assembly 48 having an axially inner surface 50 and a radially inner wall 52 that at least partially defines opening 35. Rotor assembly 32 also includes a plurality of permanent magnets 54 coupled to inner surface 50 of rotor disk assembly 48. In one suitable embodiment, magnets 54 are coupled to rotor disk assembly 48 using an adhesive. Alternatively, magnets 54 are coupled to rotor disk assembly 48 by a magnet retaining ring or any other retention method that enables electrical machine 14 to function as described herein. In the exemplary embodiment, permanent magnets 54 are symmetrical, which facilitates manufacturing by enabling a single magnet design for use with each magnet 54. Furthermore, each magnet 54 has a substantially flat profile which facilitates reducing waste during manufacturing, and therefore, facilitates reducing manufacturing cost. In the exemplary embodiment, permanent magnets 54 are neodymium magnets. Alternatively, any suitable permanent magnet material may be included that enables electrical machine 14 to function as described herein, for example, without limitation, Samarium Cobalt and Ferrite. Rotor assembly 32 is rotatable within electrical machine 14, and more specifically, rotatable within bearing assemblies 34a, 34b about center axis 24.

In the exemplary embodiment, rotor disk assembly 48 is fabricated from a solid metal material, for example, without limitation, steel or iron. Alternatively, rotor disk assembly 48 is fabricated from, for example, an SMA material, an SMC material, or a powdered ferrite material, using a sintering process. Similarly, as described above, stator core 36 is fabricated from a material that enables magnetic attraction between permanent magnets 54 and stator core 36 to facilitate retaining rotor disk assembly 48 and bearing assemblies 34a, 34b in place within electrical machine 14 such that electrical machine 14 does not require a shaft. Rotor disk assembly 48 includes a shaft portion 49 that includes a step 51 configured to facilitate holding bearing assembly 34a in place. Shaft portion 49 includes a diameter (not shown) configured to corresponding a diameter of bearing assemblies 34a, 34b. Furthermore, rotor disk assembly 48 includes a ring-shaped axially extending flange 53 that extends outward from rotor disk assembly 48 toward fan impeller 12 (not shown in FIG. 4).

In the exemplary embodiment, electrical machine 14 includes housing 56 configured to provide a protective covering for electrical machine 14 and controller assembly 46. In the exemplary embodiment, housing 56 includes an endshield 58 having an integrated flange 60 that extends axially towards rear plate 18 of fan impeller 12 (shown in FIGS. 1 and 2) from a perimeter of endshield 58. Furthermore, housing 56 includes a cover plate 62 that is configured to couple to flange 60, thereby enclosing components of electrical machine 14 within housing 56. Housing 56 is configured to maintain a stationary position of stator assembly 30, bearing assemblies 34a, 34b, and controller assembly 46 during rotation of fan impeller 12 and rotor assembly 32.

Figure 8:
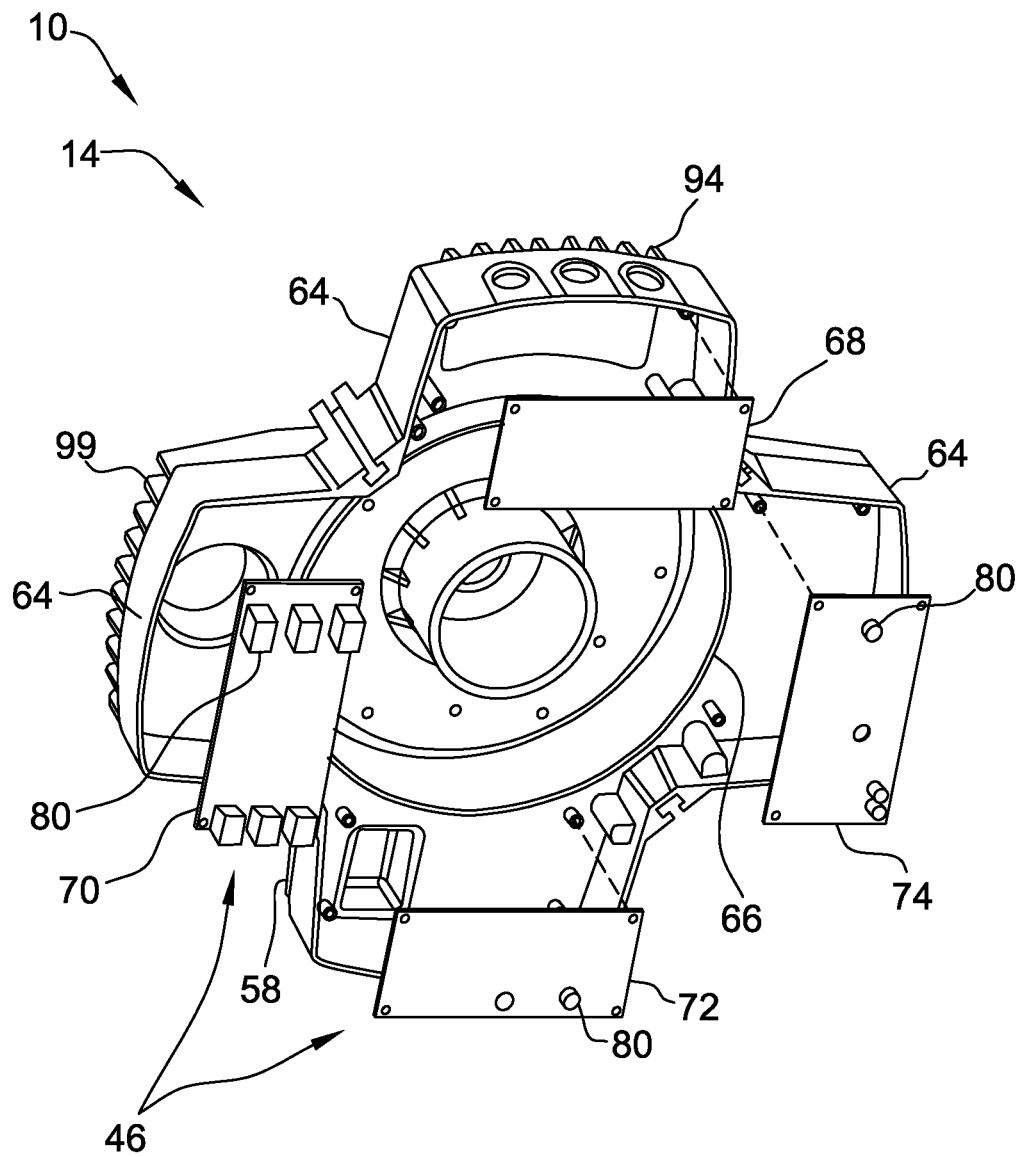
FIG. 8 is an exploded perspective view of the blower motor housing of the blower of FIG. 1, showing the comptroller boards in the pods.

In the exemplary embodiment and referring now to FIG. 8, endshield 58 is cloverleaf-shaped, having four extension portions or pods 64 extending radially outward from an annular center section 66. Alternatively, endshield 58 has fewer or more than four extension portion 64 and can have any shape that enables endshield 58 to function as described herein. Each extension portion 64 is configured to retain a component of controller assembly 46 therein.

Figure 17:
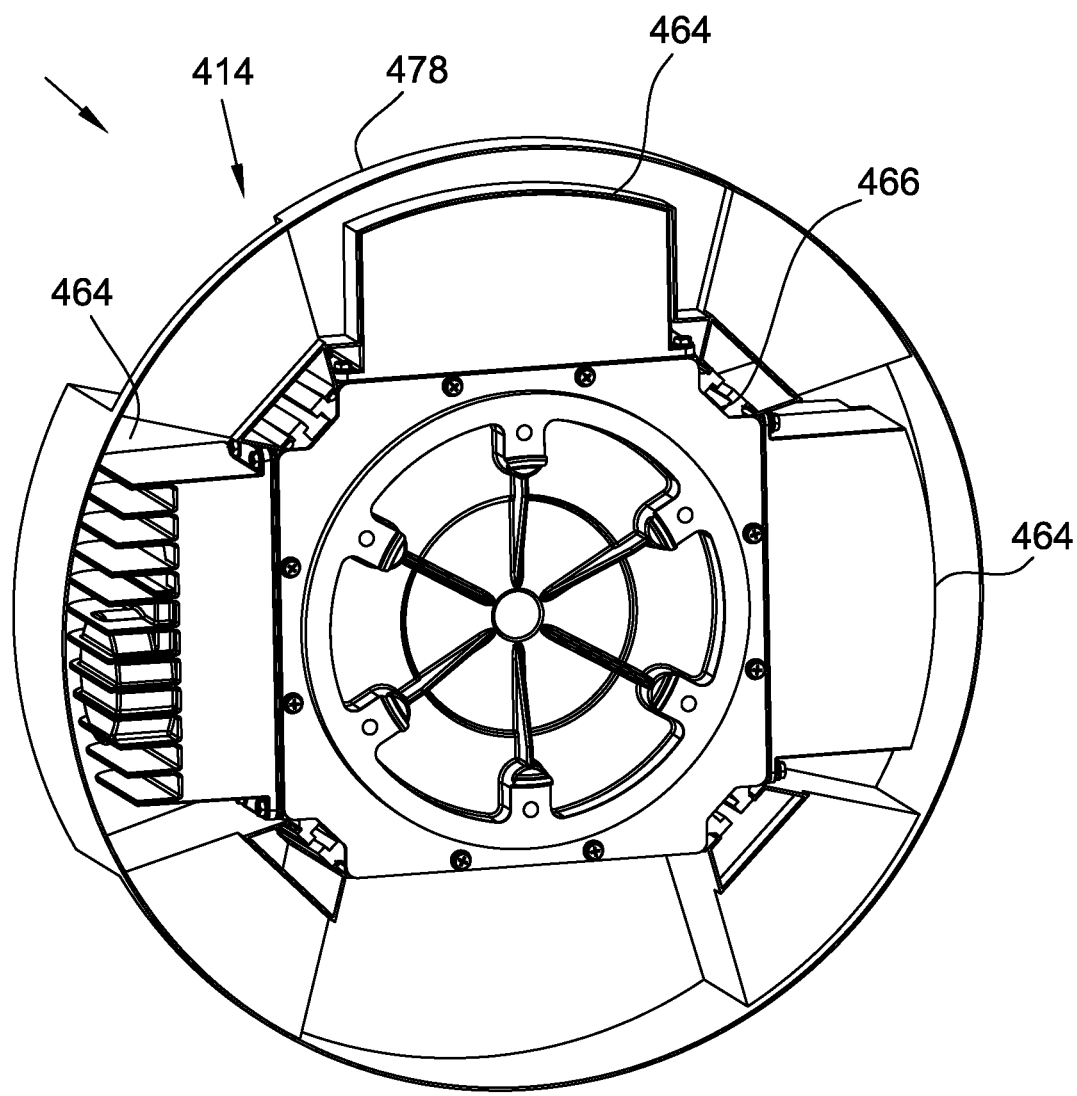
FIG. 17 is another perspective view of the blower motor of FIG. 14.
Figure 18:
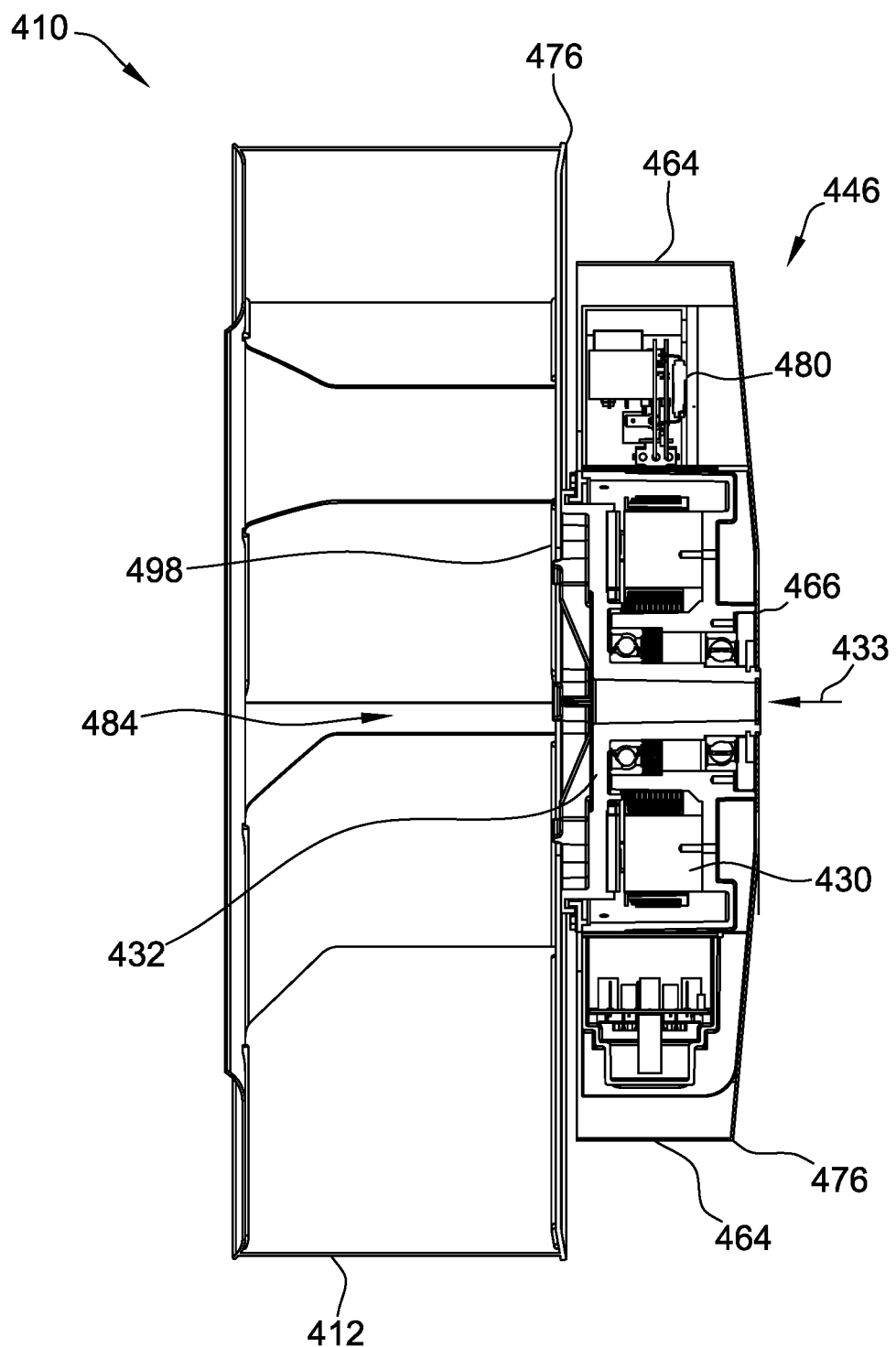
FIG. 18 is a cross-sectional view of the device of FIG. 16 along the line 18-18 in the direction of the arrows.

Controller assembly 46 includes more than one circuit board. In the exemplary embodiment, controller assembly 46 includes three circuit boards; a user interface board 68, a rectifier board 70, and an inverter board 72. Alternatively, controller assembly 46 includes fewer or more circuit boards. For example, without limitation, in one alternative embodiment shown in FIG. 17, controller assembly 46 includes four circuit boards; one located in each extension portion 64, including user interface board 68, rectifier board 70, inverter board 72, and an AC input board 74. In one suitable embodiment, controller assembly 46 includes two circuit boards such that power can be supplied directly to inverter board 72, thereby eliminating the need for rectifier board 70 and user interface board 68. Moreover, in another suitable embodiment, a single circuit board is used with controller assembly 46, such that all functions of controller assembly 46 is integrated onto the single circuit board.

In the exemplary embodiment, user interface board 68, rectifier board 70, and inverter board 72, i.e., controller assembly 46, are oriented substantially planar with respect to a back plane of stator assembly 30. As such, controller assembly 46 is not oriented axially with respect to electrical machine 14. Alternatively, one or more of boards 68, 70, and 72, can be arranged perpendicular to an axial plane of stator assembly 30, thereby enabling alternative packaging layouts. Advantages of breaking controller assembly 46 into modular board components, includes: enabling controller assembly 46 to be favorably arranged around the outside diameter of stator assembly 30; enabling controller assembly 46 to share a common heat sink, i.e., endshield 58, with stator assembly 30; arranging the boards of controller assembly 46 to separate heat making devices onto separate boards; and separating controller assembly 46 into major functions which can be built on separate boards.

In the exemplary embodiment, each one of boards 68, 70, and 72 is substantially rectangular in shape and is sized to fit a respective extension portion 64 of endshield 58. This facilitates reducing the cost of manufacturing different shape boards, for example, circular-shaped boards, that are used in axially-stacked motors. Alternatively, boards 68, 70, and 72 can be fabricated in any number of shapes that facilitates operation of fluid circulating assembly 10 as described herein. In the exemplary embodiment, boards 68, 70, and 72 are distributed around stator assembly 30 and are separated into separate functions built on a respective one boards 68, 70, and 72. Using separate boards 68, 70, and 72 having distinct functions enables the individual boards of controller assembly 46 to be updated without affecting the entire controller assembly 46. Such updates can be necessitated by end users, new components, cost savings, or obsolescence of current components. Furthermore, by separating controller assembly 46 into discrete circuit boards, the circuit sections can be arranged in different configurations to alter the final shape of electrical machine 14 and controller assembly 46. In addition, separating boards 68, 70, and 72 into separate functions facilitates spreading the heat making components of controller assembly 46 apart to facilitate cooling of controller assembly 46.

Referring again to FIGS. 1-9 and according to an aspect of the present invention, the blower 10 is provided. The blower 10 includes blower housing 76, impeller 12 and electric machine or motor 14. The impeller 12 is rotatably secured to the housing 76. The blower housing 76 may, for example, include the rear plate 18 and the inlet ring 20.

While the impeller, as shown in FIG. 1, is a centrifugal impeller type fan with a backward curved plug fan, it should be appreciated that the impeller 12 may utilize a backward curved blade, an airfoil blade, a backward inclined blade, a forward curved blade, or a radial blade.

The electric motor 14 has a motor housing 78 with a central portion or annular center section 66 and a radially extending portion or pod 64 extending from the central portion 66. The motor 14 also has a stator or stator assembly 30 secured to the central portion 66 of the motor housing 78, a rotor or rotor assembly 32 rotatably secured to the central portion 66 of the housing 78. A heat generating electrical component 80 secured to the radially extending portion 64 of the motor housing 78, and a fan 82. The fan 82 is attached to the motor and is adapted to cool the at least one heat generating electrical component.

The fan 82 as shown in FIG. 1 may be a radial flow fan. Alternatively, the fan 82 may be in the form of a forwardly curved fan, a backwardly curved fan, or an axial flow fan.

Figure 2:
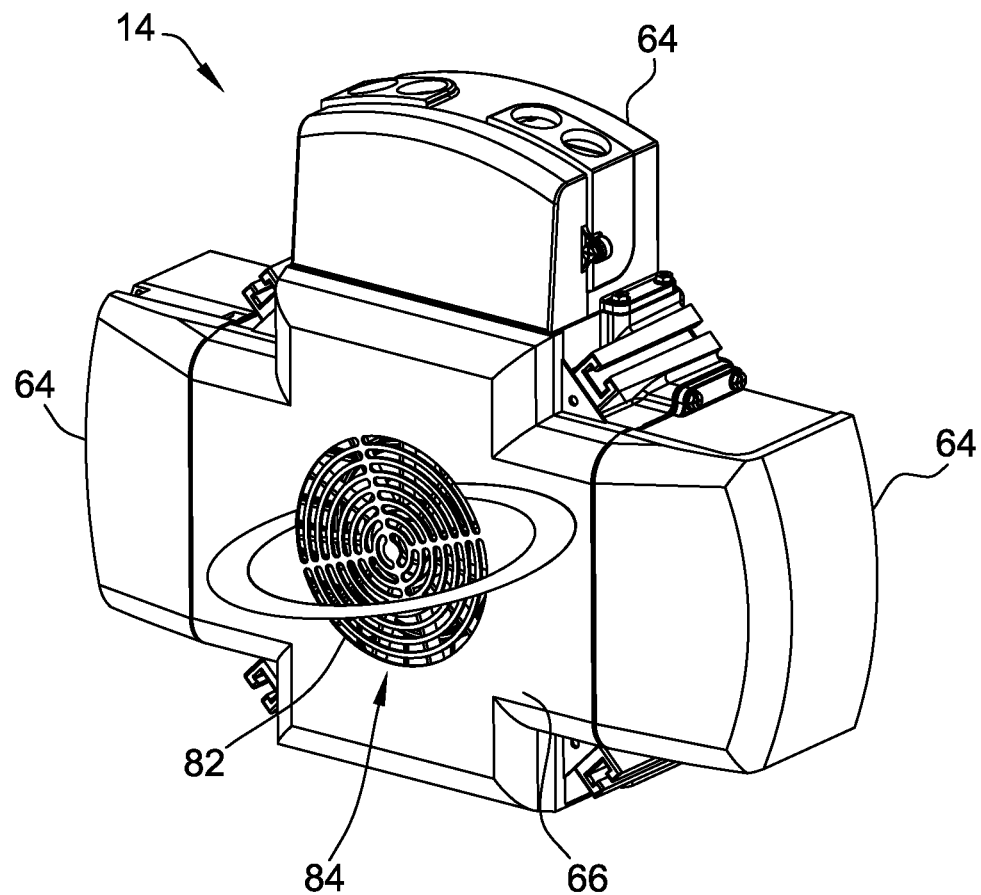
FIG. 2 is a perspective view of the blower motor for use in the blower of FIG. 1, showing the fan vent.

As shown in FIGS. 1-2, the fan 82 may include a fan inlet 84 formed in center section 66 of motor housing 78.

As shown in FIGS. 3-7, the fan 82 is utilized to cool the motor 14. While the fan 82 removes heat generated in the coils 44, the fan 82 is particularly well suited for removing heat from the heat generating electrical components 80 in the controller assembly 46. As shown, the controller assembly 46 may be positioned in the pods 64 of the motor housing 78. For example and as shown in Figures inverter board 68 with its heat generating electrical components 80 is located in a pod 64 and rectifier board 72 with its heat generating electrical components 80 is located in another pod 64. The motor housing 78 including the pods 64 are configured to permit air flow from the fan 82 to pass by the heat generating electrical components 80 to cool them.

Figure 3:
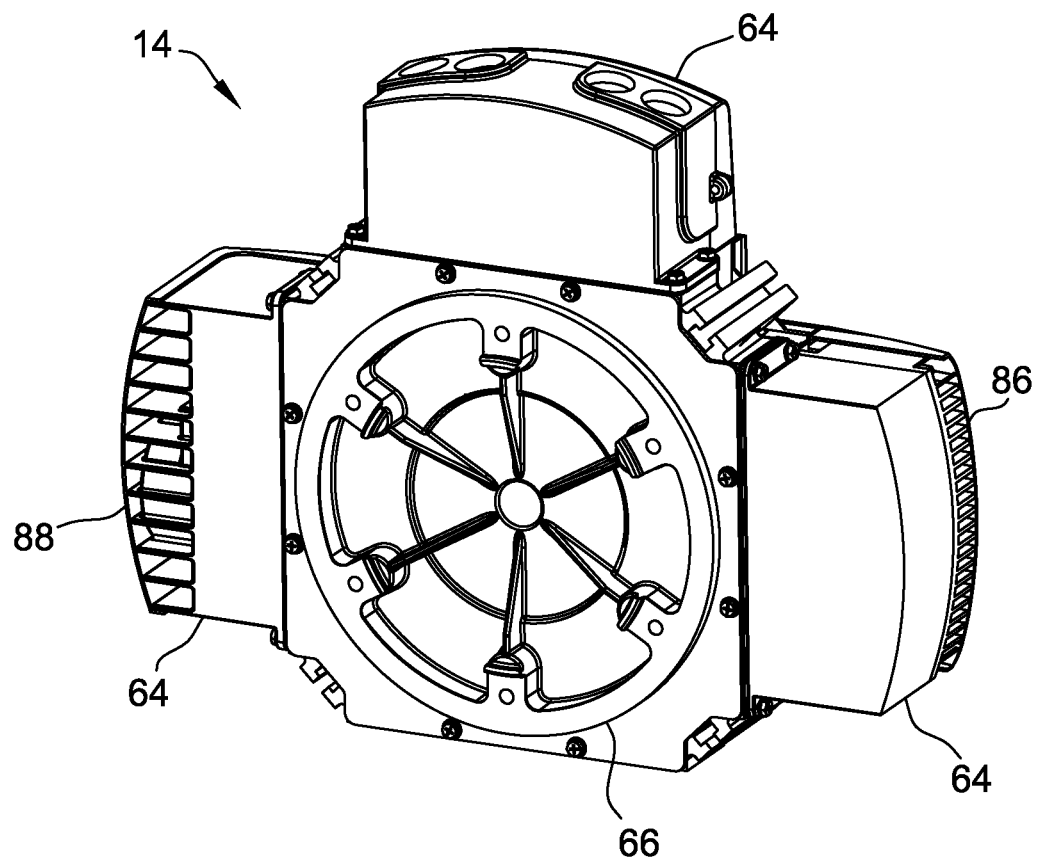
FIG. 3 is a perspective view of the blower motor for use in the blower of FIG. 1, showing outlet vents in the pods.
Figure 4:
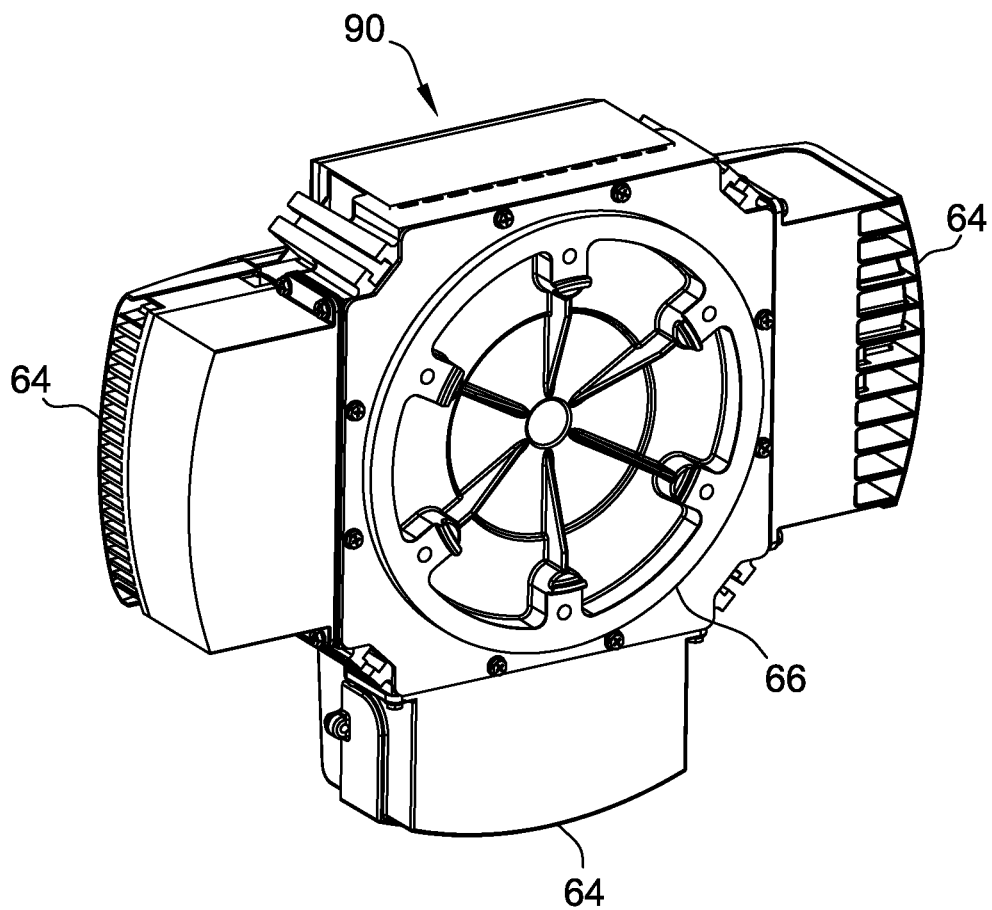
FIG. 4 is a perspective view of the blower motor for use in the blower of FIG. 1, showing the air flow regulator.

As shown in FIGS. 3-5 air enters the fan inlet 84 and exits the motor housing 78 at, for example, fan inverter pod outlet 86 and at fan rectifier pod outlet 88. The air may be directed radially inwardly toward fan 82, as shown in FIG. 6, or the air may be directed radially outwardly away from fan 82, as shown in FIG. 5.

Referring to FIG. 4, the motor 14 may further include a regulator 90 for regulating a flow of air from the fan toward the components 80. The regulator 90, as shown, may be manually adjustable or may include a device to remotely adjust to regulator. Alternatively or in addition the motor may further include a shroud 92 positioned in the flow of air from the fan toward the component to limit the flow of air to the components 80. The shroud 92 may be solid as shown or may be adapted to at least one of to control exit area to match fan inlet area and to optimize are exits to locations where application might help with cooling. The shroud 92 and the regulator 90 may be positioned anywhere in the path of the air and may, for example, be located in the air inlet 84 or the air outlets 86 or 88. The shroud 92 and the regulator 90 may be adapted to regulate the amount of cooling going to the radially extending portions or pods 64 of the motor housing 78. The motor 14 may be provided wherein the shroud 92 or the regulator 90 is adapted to at least one of to control exit area to match fan inlet area and to optimize exit locations where application might help with cooling.

Referring now to FIG. 7, the fan 82 is shown in greater detail. While the fan 82 may have any suitable configuration and may be made of any suitable materials, the fan 82 as shown, includes a stem 94 connected to rotor assembly 32 and rotatable therewith. A fan body 96 is mounted to stem 94. Fan blades 98 are positioned on fan body 96.

Figure 9:
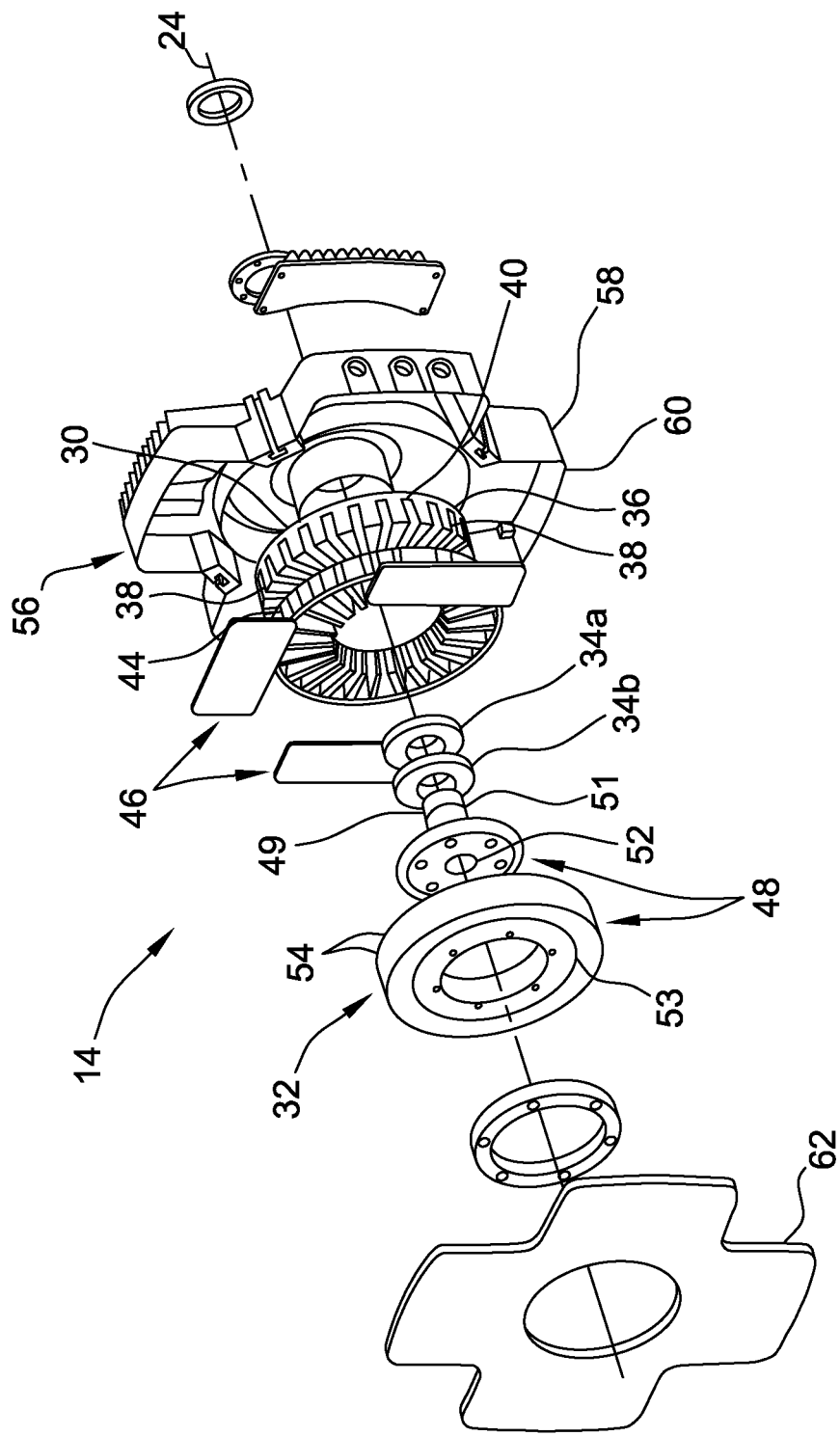
FIG. 9 is an exploded perspective view of the blower motor for the blower of FIG. 1, with the fan removed for clarity.

Referring now to FIGS. 8 and 9, the motor 14 is shown in greater detail in exploded views. The major components of the motor 14 are shown in FIG. 9, while FIG. 8 shows the boards 68, 70, 72 and 74 including the components 80 positioned in the pods 64. In addition to the fan 82, the motor housing 78 may include fins 99 for providing additional cooling capacity to the motor housing 78.

Figure 10:
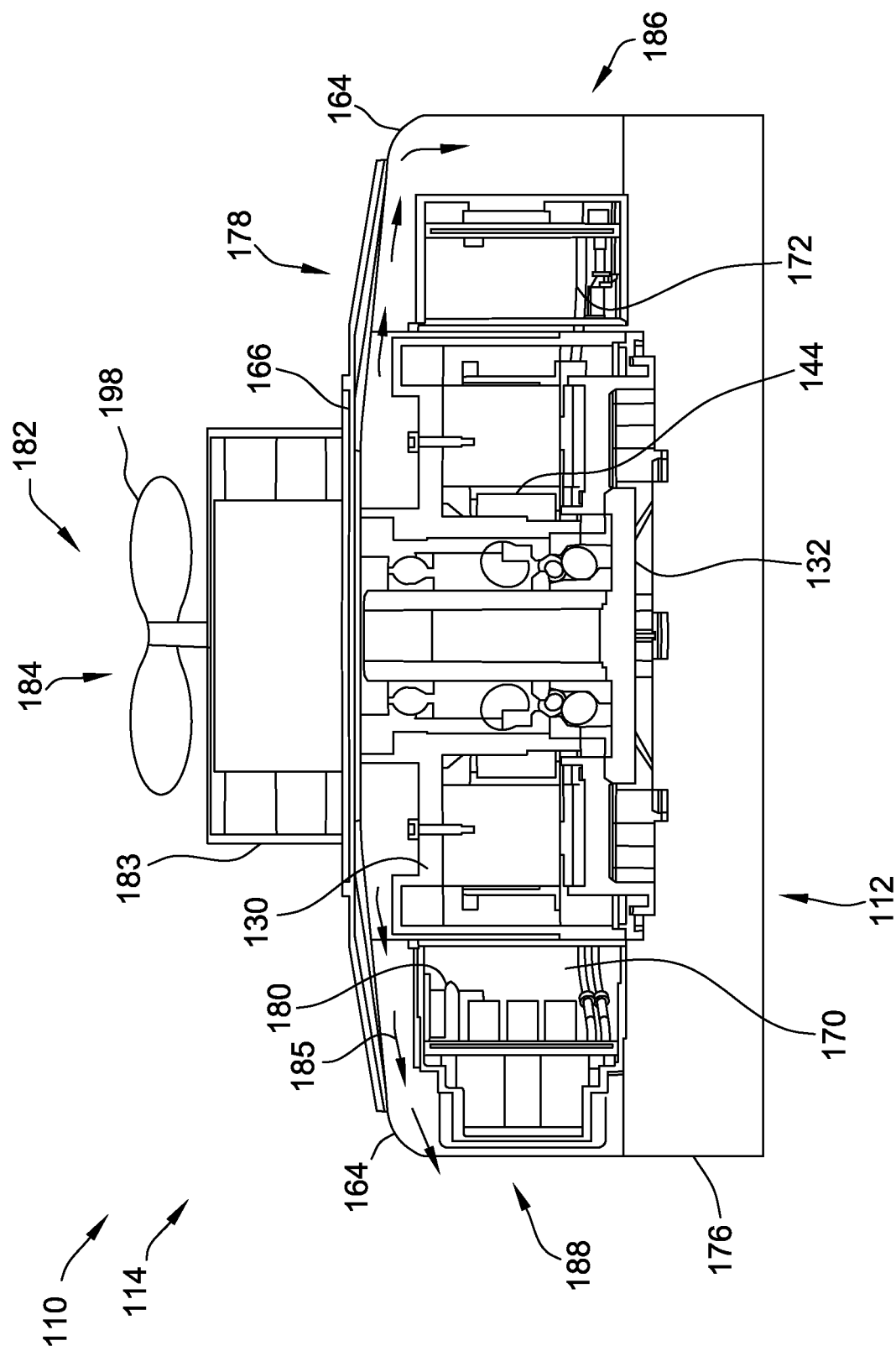
FIG. 10 is a plan view, partially in cross-section, of another embodiment of the blower motor of the present invention with a separate fan with its own motor, showing air flow in a first direction.
Figure 11:
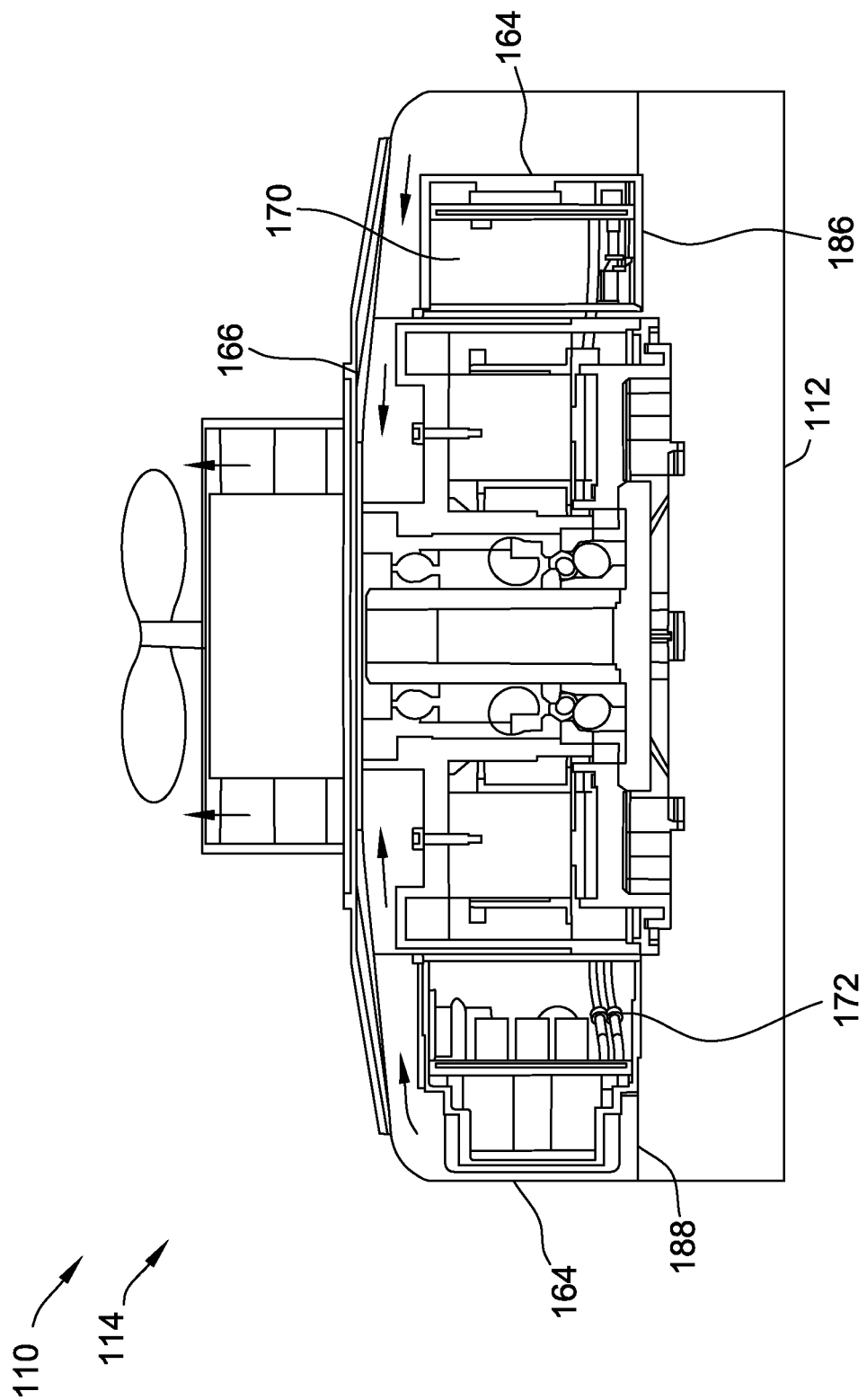
FIG. 11 is a plan view, partially in cross-section, of FIG. 10, showing air flow in a second direction opposed to the first direction.

According to another aspect of the present invention and referring now to FIGS. 10-11, a blower 110 including a motor 114 has a separate fan 182 powered by its own fan motor 183 for generating an air flow 185 and for directing that air flow 185 on heat generating electrical component 180. It should be appreciated that the blower 110 and the motor 114 are similar to the blower 10 (with a fan impeller in the form of a backward curved plug fan) of FIGS. 1-9 and the motor 14 of FIGS. 1-9 (an axial flux electric motor with an electronic controller). It should also be appreciated that the blower 110 and the motor 114 may have added details and alternate configurations as described in greater detail with respect to the blower 10 and the motor 14 of FIGS. 1-9.

As shown in FIGS. 10-11, the blower 110 includes a blower or impeller housing 176, an impeller 112 rotatably secured to the housing 176, blower motor 114 and fan 182. The blower motor 114 has a motor housing 178 with a central portion 166 and a radially extending portion 164 extending from the central portion 166, a stator 130 secured to the central portion 166 of the motor housing 178, a rotor 132 rotatably secured to the central portion 166 of the motor housing 178, and at least one heat generating electrical component 180 secured to the radially extending portion 164 of the motor housing 178. The fan 182 is attached to the motor housing 178 and is adapted to cool the at least one heat generating electrical component 80. The fan 182 includes a blade 198 and fan motor 183.

The fan 182 may be a radial flow fan. Alternatively, the fan 182 may be in the form of a forwardly curved fan, a backwardly curved fan, or an axial flow fan. The fan 182 may include a fan inlet 184 formed in center section 166 of motor housing 178.

As shown in FIGS. 10-11, the fan 182 is utilized to cool the motor 114. While the fan 182 removes heat generated in the coils 144, the fan 182 is particularly well suited for removing heat from the heat generating electrical components 180 in the controller assembly 146. As shown, the controller assembly 146 may be positioned in the pods 164 of the motor housing 178. For example and as shown in FIGS. 10-11, inverter board 172 with its heat generating electrical components 180 is located in a pod 164 and rectifier board 170 with its heat generating electrical components 180 is located in another pod 164. The motor housing 178 including the pods 164 are configured to permit air flow from the fan 182 to pass by the heat generating electrical components 180 to cool them.

As shown in FIGS. 10-11 air enters the fan inlet 184 and exits the motor housing 178 at, for example, fan inverter pod outlet 186 and at fan rectifier pod outlet 188. The air may be directed radially inwardly toward fan 182 or the air may be directed radially outwardly away from fan 182.

Figure 12:
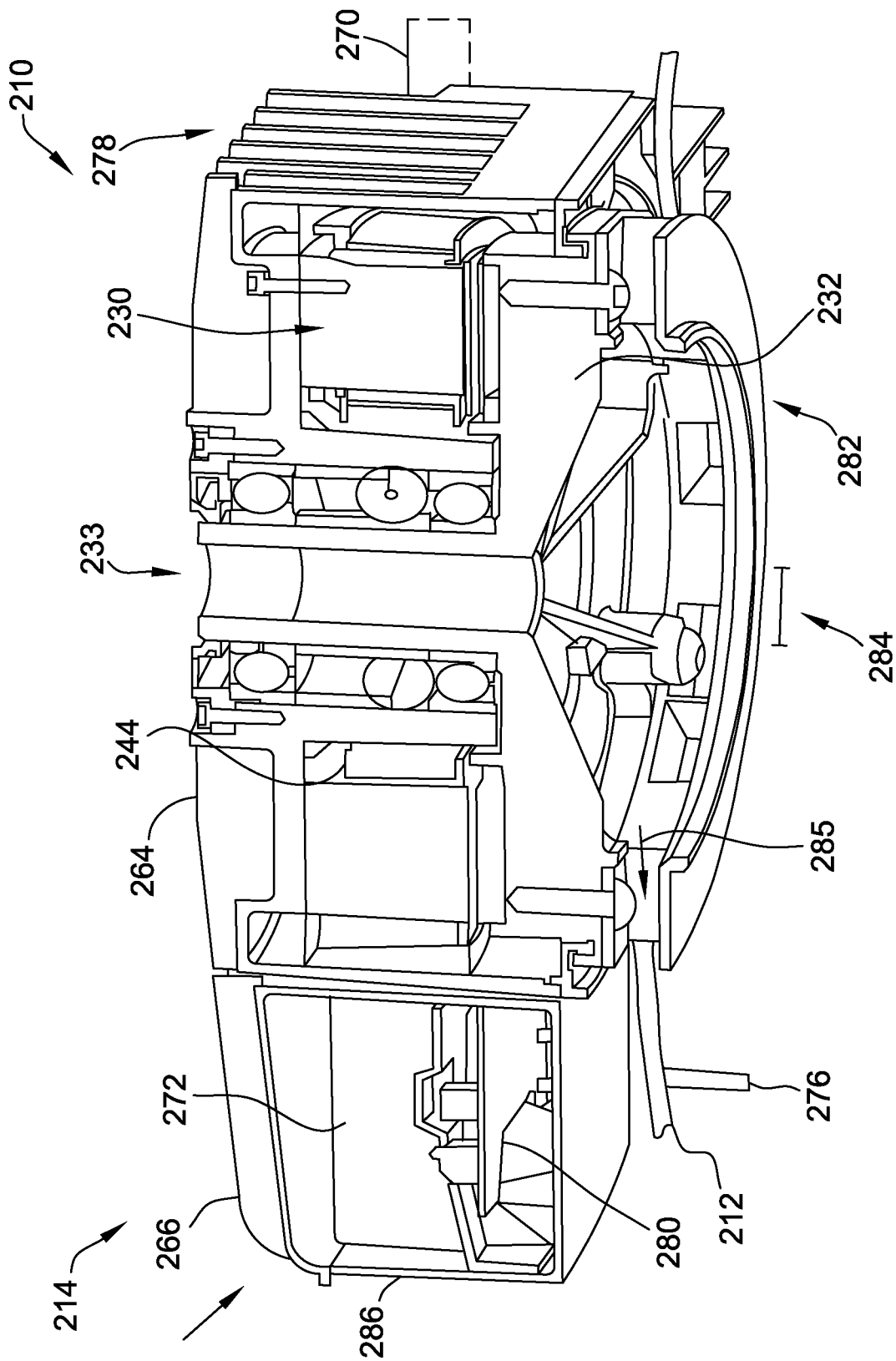
FIG. 12 is a plan view, partially in cross-section, of the blower motor of another embodiment of the present invention with a fan that is part of the rotor, showing air flow in a first direction.

Referring now to FIG. 12 and according to another aspect of the present invention, a blower 210 includes an integral fan 282 that is attached to or is a part of the rotor 232 for generating an air flow 285 and directing that air flow on the heat generating electrical component 280. The blower is driven by motor 214.

It should be appreciated that the blower 210 and the motor 214 are similar to the blower 10 (with a fan impeller in the form of a backward curved plug fan) of FIGS. 1-9 and the motor 14 of FIGS. 1-9 (an axial flux electric motor with an electronic controller). It should also be appreciated that the blower 210 and the motor 214 may have added details and alternate configurations as described in greater detail with respect to the blower 10 and the motor 14 of FIGS. 1-9.

The blower 210 may include an impeller or blower housing 276, an impeller 212 rotatably secured to the blower housing 276, and the electric motor 214. The electric motor 214 has a motor housing 278 with a central portion 266 and a radially extending portion 264 extending from the central portion 266, a stator 230 secured to the central portion 266 of the motor housing 278, a rotor 232 rotatably secured to the central portion 266 of the motor housing 278, at least one heat generating electrical component 280 secured to the radially extending portion 264 of the motor housing 278, and fan 282 attached to the rotor 232 and adapted to cool the at least one heat generating electrical component 280. The rotor 232 may have a central opening 233 adapted to provide an air flow through the opening 233 to assist in cooling the components 280.

The fan 282 may be a radial flow fan. Alternatively, the fan 282 may be in the form of a forwardly curved fan, a backwardly curved fan, or an axial flow fan. The fan 282 may include a fan inlet 284 formed in center section 266 of motor housing 278.

As shown in FIG. 12, the fan 282 is utilized to cool the motor 214. While the fan 282 removes heat generated in coils 244, the fan 282 is particularly well suited for removing heat from the heat generating electrical components 280 in controller assembly 246. As shown, the controller assembly 246 may be positioned in the pods 264 of the motor housing 278. For example and as shown in FIG. 12, inverter board 272 with its heat generating electrical components 280 is located in a pod 264 and rectifier board 270 with its heat generating electrical components 280 is located in another pod 264. The motor housing 278 including the pods 264 are configured to permit air flow from the fan 282 to pass by the heat generating electrical components 280 to cool them.

As shown in FIG. 12 air enters the fan inlet 284 and exits the motor housing 278 at, for example, fan inverter pod outlet 286 and at fan rectifier pod outlet 288. The air may be directed radially inwardly toward fan 282 or the air may be directed radially outwardly away from fan 282.

Figure 13:
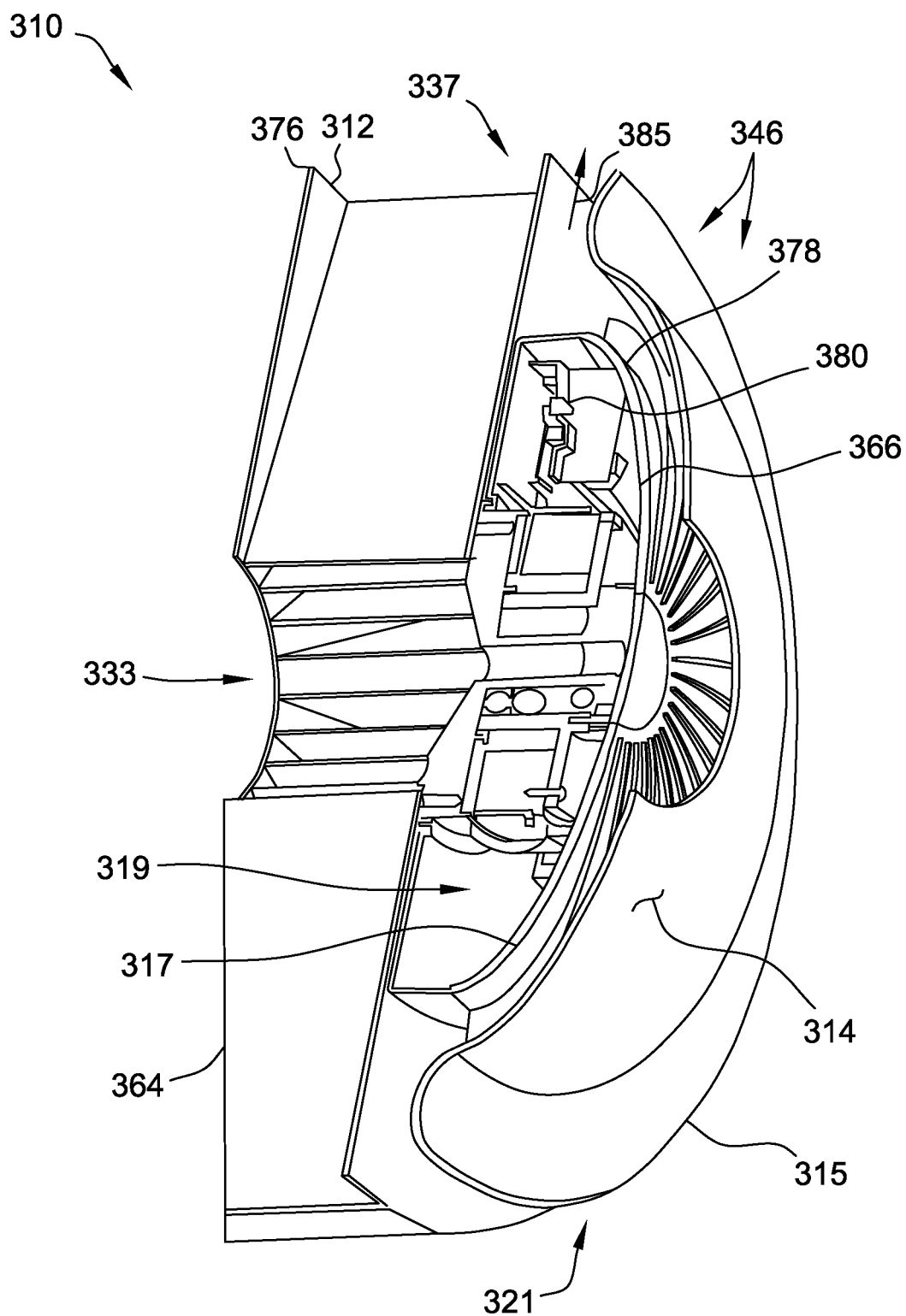
FIG. 13 is a perspective view, partially in cross-section, of another embodiment of the blower motor of the present invention having a plenum to direct convention, radiation or forced air from the blower over the electrical components.
Figure 14:
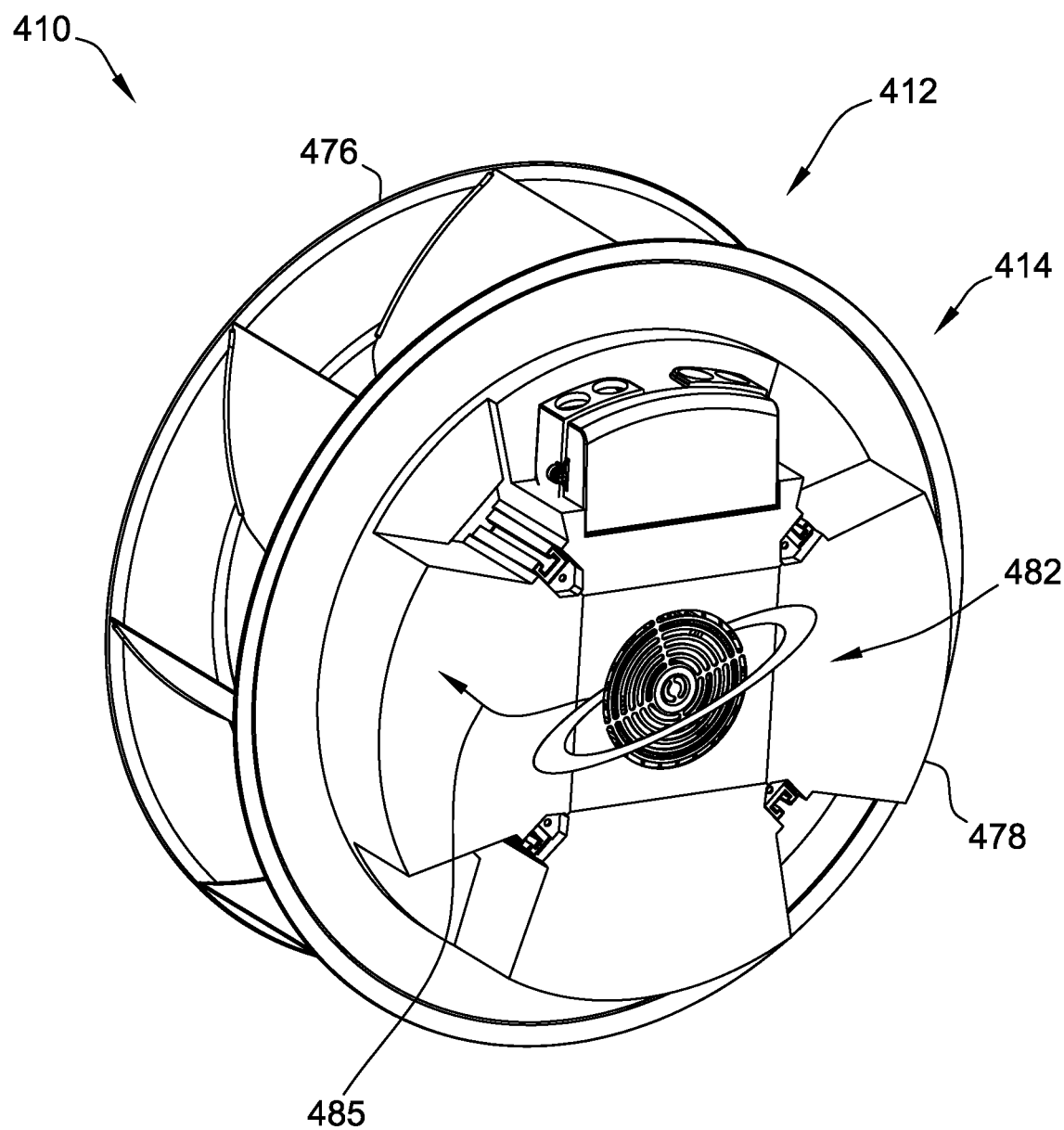
FIG. 14 is a perspective view of another embodiment of the blower motor of the present invention having a blades on the impeller wheel and a shroud to cool the electrical components.
Figure 15:
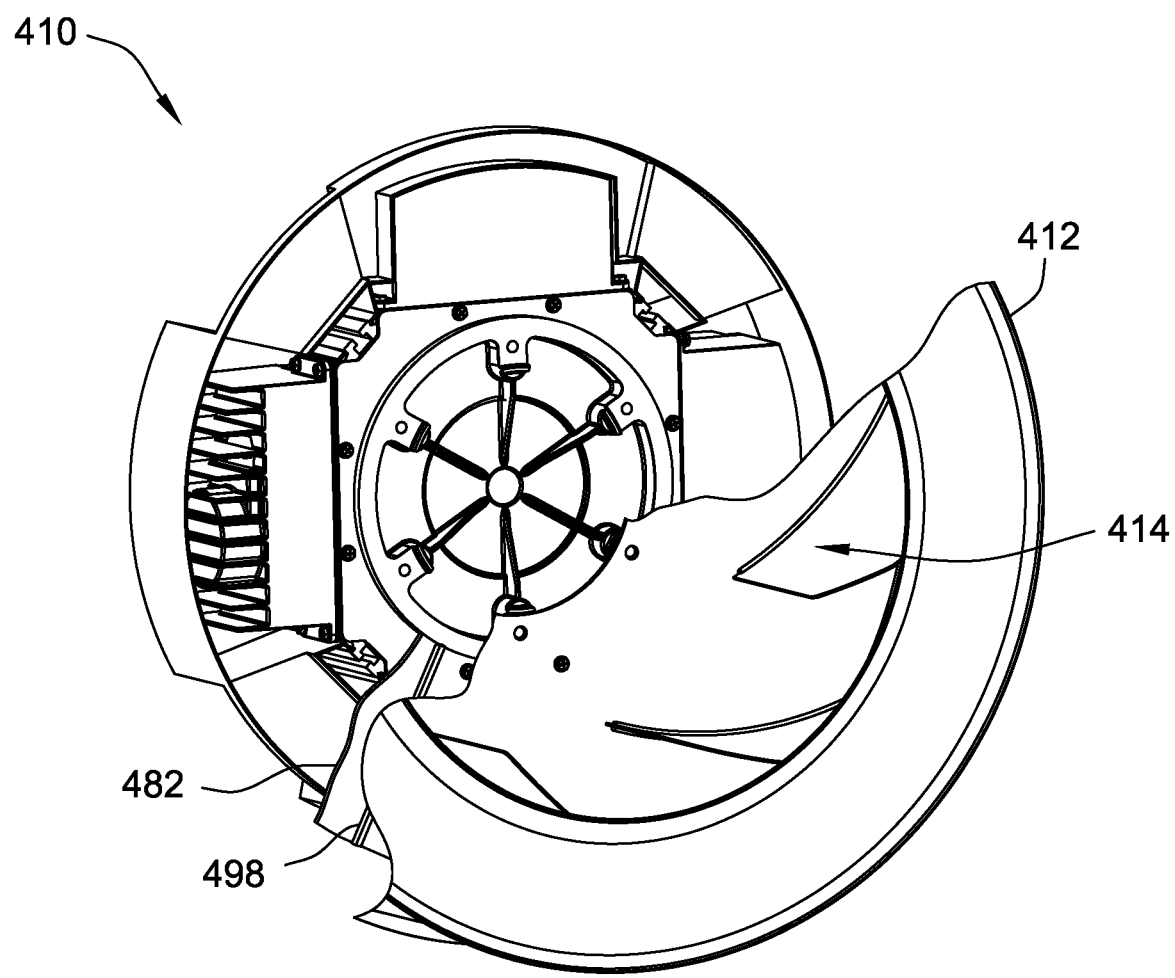
FIG. 15 is another perspective view of the blower motor of FIG. 14.
Figure 16:
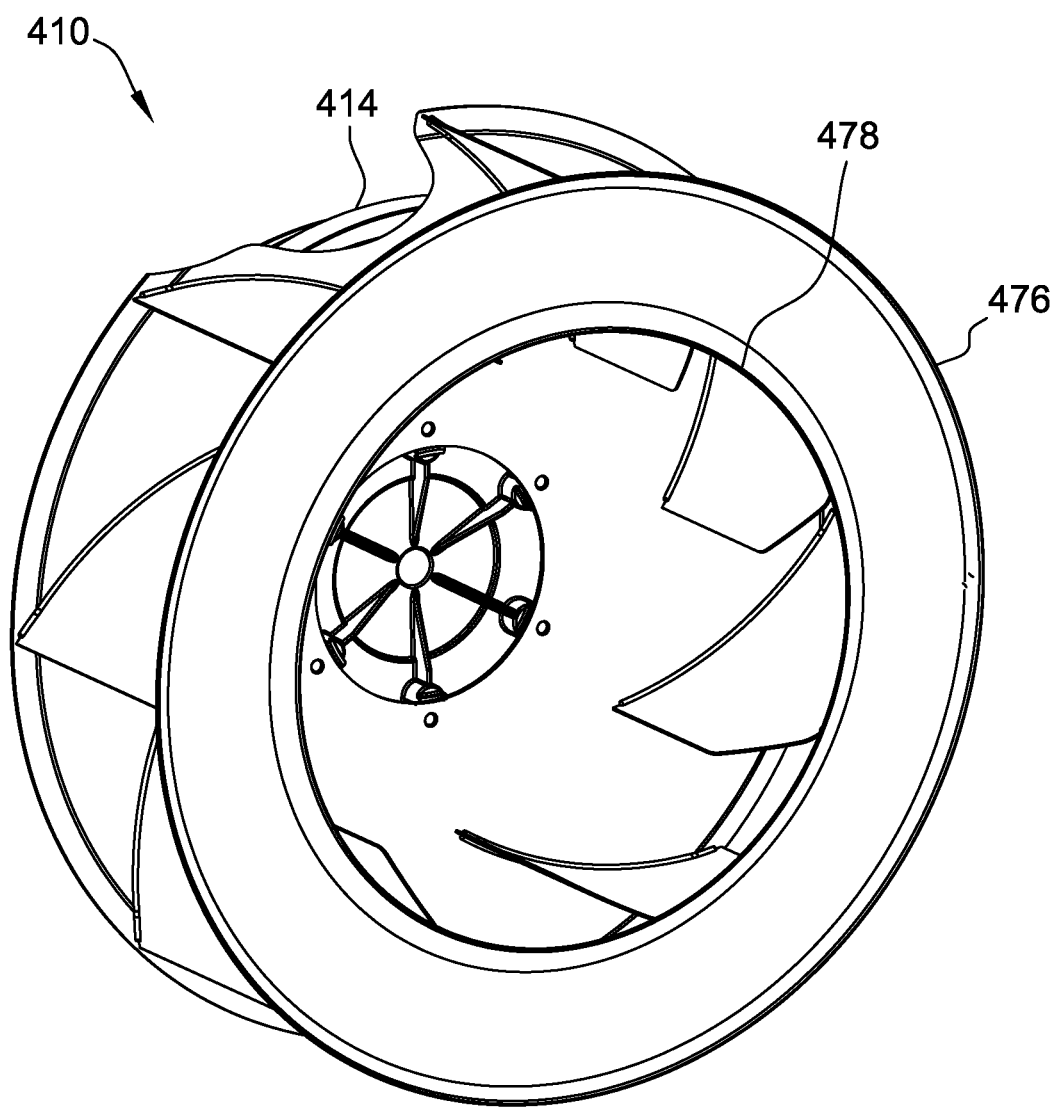
FIG. 16 is another perspective view of the blower motor of FIG. 14.

Referring now to FIG. 13 and according to another aspect of the present invention, a blower 310 includes a motor 314 having a fully circular plenum 315 that may be used to generate an air flow 385 and to direct that air flow 385 on heat generating electrical component 380.

It should be appreciated that the blower 310 and the motor 314 are similar to the blower 10 (with a fan impeller in the form of a backward curved plug fan) of FIGS. 1-9 and the motor 14 of FIGS. 1-9 (an axial flux electric motor with an electronic controller). It should also be appreciated that the blower 310 and the motor 314 may have added details and alternate configurations as described in greater detail with respect to the blower 10 and the motor 14 of FIGS. 1-9.

As shown in FIG. 13, the blower 310 includes a blower housing 376, an impeller 312 rotatably secured to the housing 376, electric motor 314 and plenum 315.

The plenum 315, as shown in FIG. 13 is a circular member having a concave interior 317 for covering at least a portion of the motor 314. The plenum 315, together with the impeller 312 provides a cavity 319 in which the motor resides. The cavity 319 may be placed under a negative or positive pressure with respect to the ambient pressure outside the motor 314. The pressure gradient, in addition to possible natural convection and radiation, and further in addition to optional force flow from a fan, may cause air flow within the cavity 319 and out plenum outlet 321.

As shown in FIG. 13, the electric motor 314 may have a motor housing 378 with a central portion 366 and a radially extending portion 364 extending from the central portion 366, a stator 330 secured to the central portion 366 of the motor housing 378, a rotor 332 rotatably secured to the central portion of the housing 378, and at least one heat generating electrical component 380 secured to the radially extending portion 364 of the motor housing 378. The plenum 315 is attached to the motor 314 and is adapted to cool the at least one heat generating electrical component 380.

The blower 310 may further include a regulator (not shown) for regulating a flow of air 385 from the plenum 315 toward the component 380.

The blower may further include a shroud (not shown) positioned in the flow of air 385 from the plenum 315 toward the component 380. The shroud may be adapted to control exit area to match fan inlet area and to optimize air exits to locations where application might help with cooling.

The central portion 366 of the motor housing 378 may define a centrally located opening 333 therethrough, the opening 333 providing an inlet for the plenum 315.

The radially extending portion 364 of the motor housing 378 may define a plenum outlet 321 thereof.

Referring now to FIGS. 14-18 and according to another aspect of the present invention, a blower 410 includes a fan 482 that is attached to or becomes a part of impeller 412. The fan 482 is connected to motor 414 for generating an air flow 485 and to direct that air flow 485 on heat generating electrical component 480 of controller assembly 446.

It should be appreciated that the blower 410 and the motor 414 are similar to the blower 10 (with a fan impeller in the form of a backward curved plug fan) of FIGS. 1-9 and the motor 14 of FIGS. 1-9 (an axial flux electric motor with an electronic controller). It should also be appreciated that the blower 410 and the motor 414 may have added details and alternate configurations as described in greater detail with respect to the blower 10 and the motor 14 of FIGS. 1-9.

As shown in FIGS. 14-18, the blower includes a blower housing 476, impeller 412 rotatably secured to the blower housing 476, and the electric motor 414. The electric motor 414 has a motor housing 478 with a central portion 466 and a radially extending portion 464 extending from the central portion 466, a stator 430 secured to the central portion 466 of the motor housing 478, a rotor 432 rotatably secured to the central portion 466 of the housing 478, and at least one heat generating electrical component 480 secured to the radially extending portion 464 of the motor housing 478. The impeller 412 includes a fan 482 adapted to cool the at least one heat generating electrical component 480. The fan 482 includes at least one fan blade 498.

The fan 482 may be a radial flow fan. Alternatively, the fan 482 may be in the form of a forwardly curved fan, a backwardly curved fan, or an axial flow fan. The fan 482 may include a fan inlet 484 formed in center section 466 of motor housing 478. The rotor 432 may have a central opening 433 adapted to provide an air flow through the opening 433 to assist in cooling the components 480.

Figure 19:
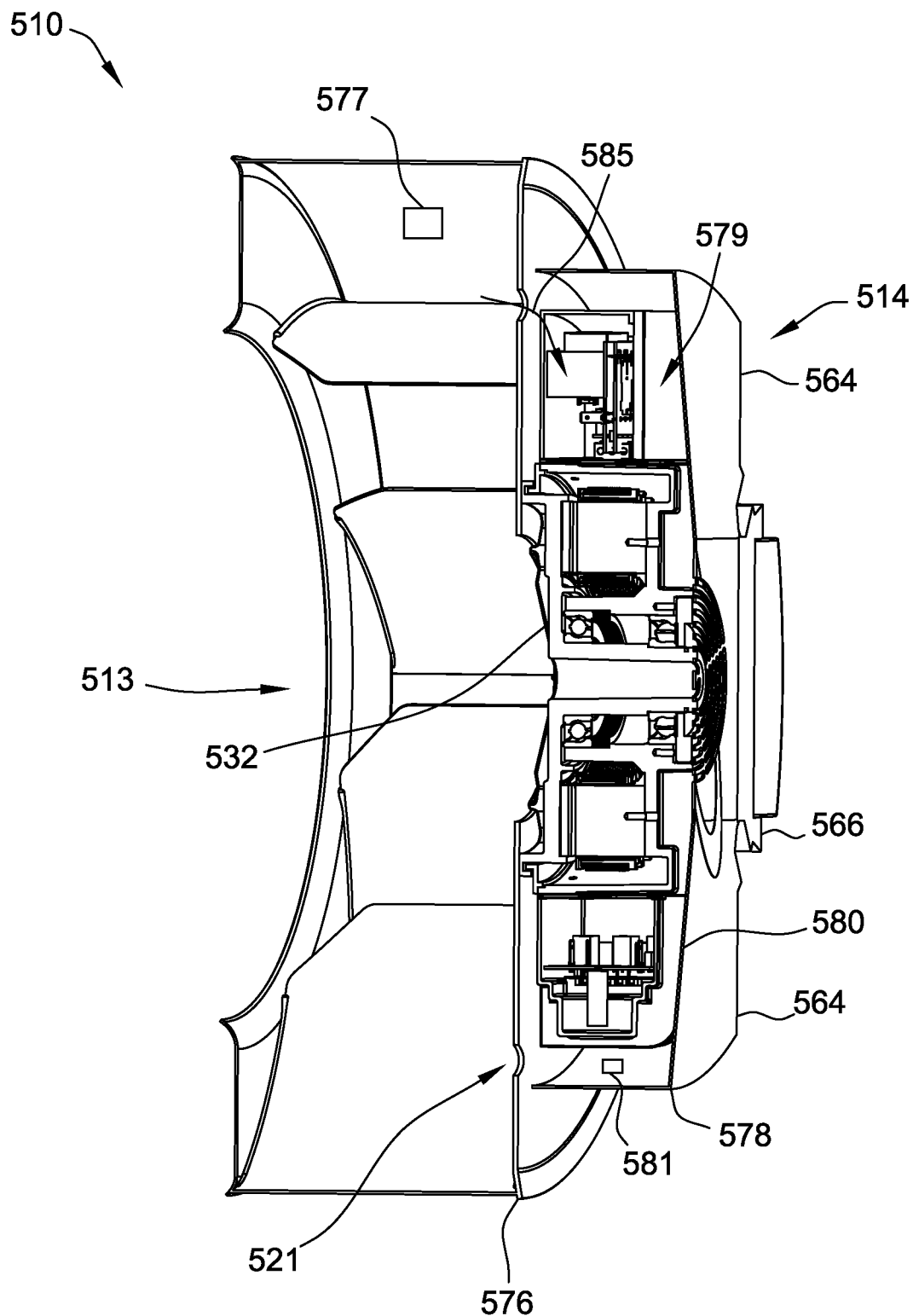
FIG. 19 is a perspective view, partially in cross-section, of another embodiment of the blower motor of the present invention having apertures between the blower motor and the blower to utilize a negative pressure gradient to provide air flow to cool electrical components.
Figure 20:
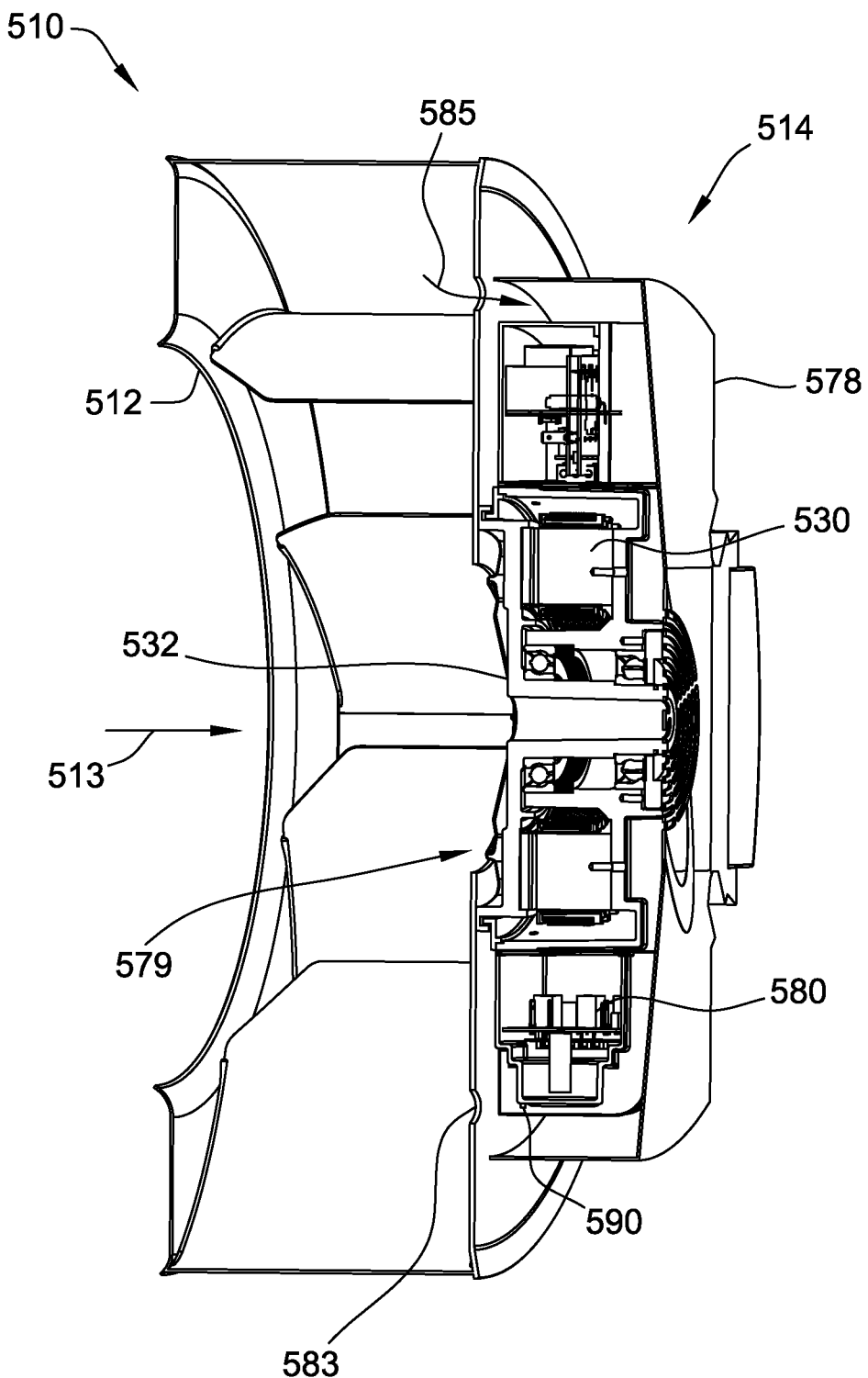
FIG. 20 is a perspective view, partially in cross-section, of the blower motor of FIG. 19 utilizing a positive pressure gradient to provide air flow to cool electrical components.

Referring now to FIGS. 19-20 and according to another aspect of the present invention, a blower 510 may be provided with a feature that uses the difference in air pressure between impeller chamber 513 of the blower 510 and the motor chamber 579 of motor 514 to generate an air flow 585 and to direct that air flow 585 on the heat generating electrical component 580.

Figure 21:
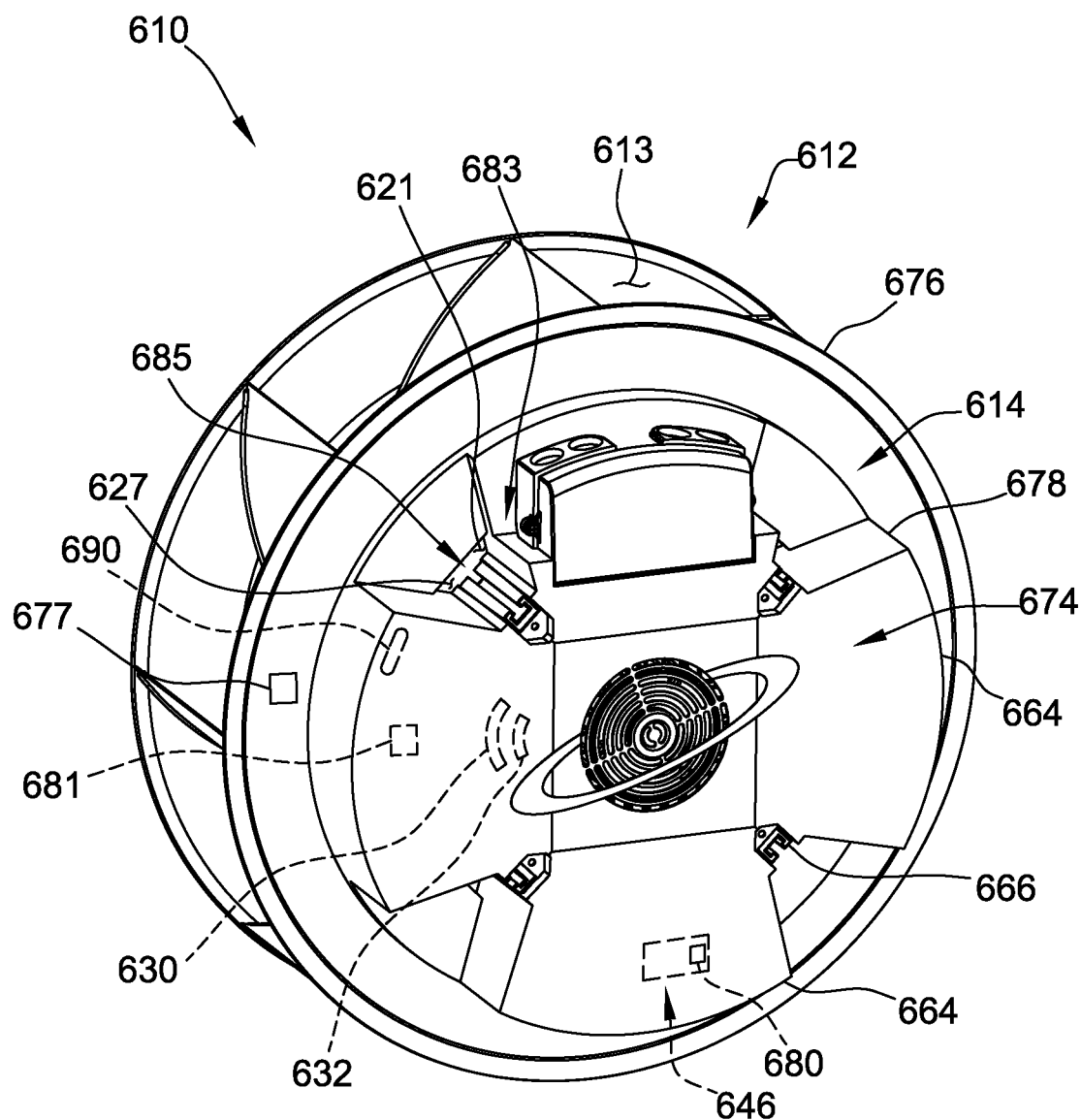
FIG. 21 is a perspective view of another embodiment of the blower motor of the present invention utilizing vents in the impeller backplate to generate a pressure gradient to provide air flow to cool electrical components.

It should be appreciated that different features may be used to provide the air pressure difference and such different features include those shown in the blower 510 of FIGS. 19-20, in blower 610 of FIG. 21 and in blower 710 of FIGS. 22-25.

As shown in FIGS. 19-20 and according to another aspect of the present invention, the blower 510 includes an impeller housing 576; an impeller 512 rotatably secured to the impeller housing 576; and electric motor 514. The electric motor 514 has a motor housing 578 with a central portion 566 and a radially extending portion 564 extending from the central portion 566, a stator 530 secured to the central portion 566 of the motor housing 578, a rotor 532 rotatably secured to the central portion 566 of the housing 578, and at least one heat generating electrical component 580 secured to the radially extending portion 564 of the motor housing 578.

As shown, the impeller housing 576 has a first air pressure 577 therein and the motor housing 578 has a second air pressure 581 therein different that the first air pressure 577. The impeller housing 576 and the motor housing 578 define a passageway 583 therebetween whereby the difference in air pressure generates air flow 585 within the motor housing 578 to cool the at least one heat generating electrical component 580.

It should be appreciated that the blower 510 and the motor 514 are similar to the blower 10 (with a fan impeller in the form of a backward curved plug fan) of FIGS. 1-9 and the motor 14 of FIGS. 1-9 (an axial flux electric motor with an electronic controller). It should also be appreciated that the blower 510 and the motor 514 may have added details and alternate configurations as described in greater detail with respect to the blower 10 and the motor 14 of FIGS. 1-9.

As shown, the blower 510 may be provided with a regulator 590 for regulating a flow of air from the impeller housing 576 toward the component 580.

As shown, the blower 510 may be provided with feature 521 that uses the difference in air pressure between the impeller chamber 513 of the blower 510 and the motor chamber 579 of the motor 514 to generate an air flow 585 and to direct that air flow 585 on the heat generating electrical component 580.

As shown, the impeller housing 576 and the motor housing 578 may be adjoined to each other. The feature 521 may be in the form of an opening 527 in the impeller housing 576 and an opening 529 in the motor housing 578. The opening 527 of the impeller housing 576 and are the opening 529 of the motor housing 578 are aligned to permit air to flow form the impeller housing 576 to the motor housing 578 to cool the component 580.

Referring now to FIG. 21 and according to another aspect of the present invention, a blower 610 may be provided with a feature 621 that uses the difference in air pressure between impeller chamber 613 of the blower 610 and the motor chamber 679 of motor 614 to generate an air flow 685 and to direct that air flow 685 on heat generating electrical component 680 of controller 646. The feature 621 is different than the feature 521 of the blower 510 of FIGS. 19-20.

As shown in FIG. 21, the blower 610 includes an impeller housing 676; an impeller 612 rotatably secured to the impeller housing 676; and electric motor 614. The electric motor 614 has a motor housing 678 with a central portion 666 and a radially extending portion 664 extending from the central portion 666, a stator 630 secured to the central portion 666 of the motor housing 678, a rotor 632 rotatably secured to the central portion 666 of the housing 678, and at least one heat generating electrical component 680 secured to the radially extending portion 664 of the motor housing 678.

As shown, the impeller housing 676 has a first air pressure 677 therein and the motor housing 678 has a second air pressure 681 therein different that the first air pressure 677. The impeller housing 676 and the motor housing 678 define a passageway 683 therebetween whereby the difference in air pressure generates air flow 685 within the motor housing 678 to cool the at least one heat generating electrical component 680.

It should be appreciated that the blower 610 and the motor 614 are similar to the blower 10 (with a fan impeller in the form of a backward curved plug fan) of FIGS. 1-9 and the motor 14 of FIGS. 1-9 (an axial flux electric motor with an electronic controller). It should also be appreciated that the blower 610 and the motor 614 may have added details and alternate configurations as described in greater detail with respect to the blower 10 and the motor 14 of FIGS. 1-9.

As shown, the blower 610 may be provided with a regulator 690 for regulating a flow of air from the impeller housing 676 toward the component 680.

As shown, the blower 610 may be provided with feature 621 that uses the difference in air pressure between the impeller chamber 613 of the blower 610 and the motor chamber 679 of the motor 614 to generate an air flow 685 and to direct that air flow 685 on the heat generating electrical component 680.

As shown, the impeller housing 676 and the motor housing 678 may be adjoined to each other. The feature 621 may be in the form of a vent 627 in the rear plate or back plate 518 of impeller housing 676. The vent 627 of the impeller housing 676 and the motor housing 678 are aligned to permit air to flow from the impeller housing 676 to the motor housing 678 to cool the component 680.

Figure 22:
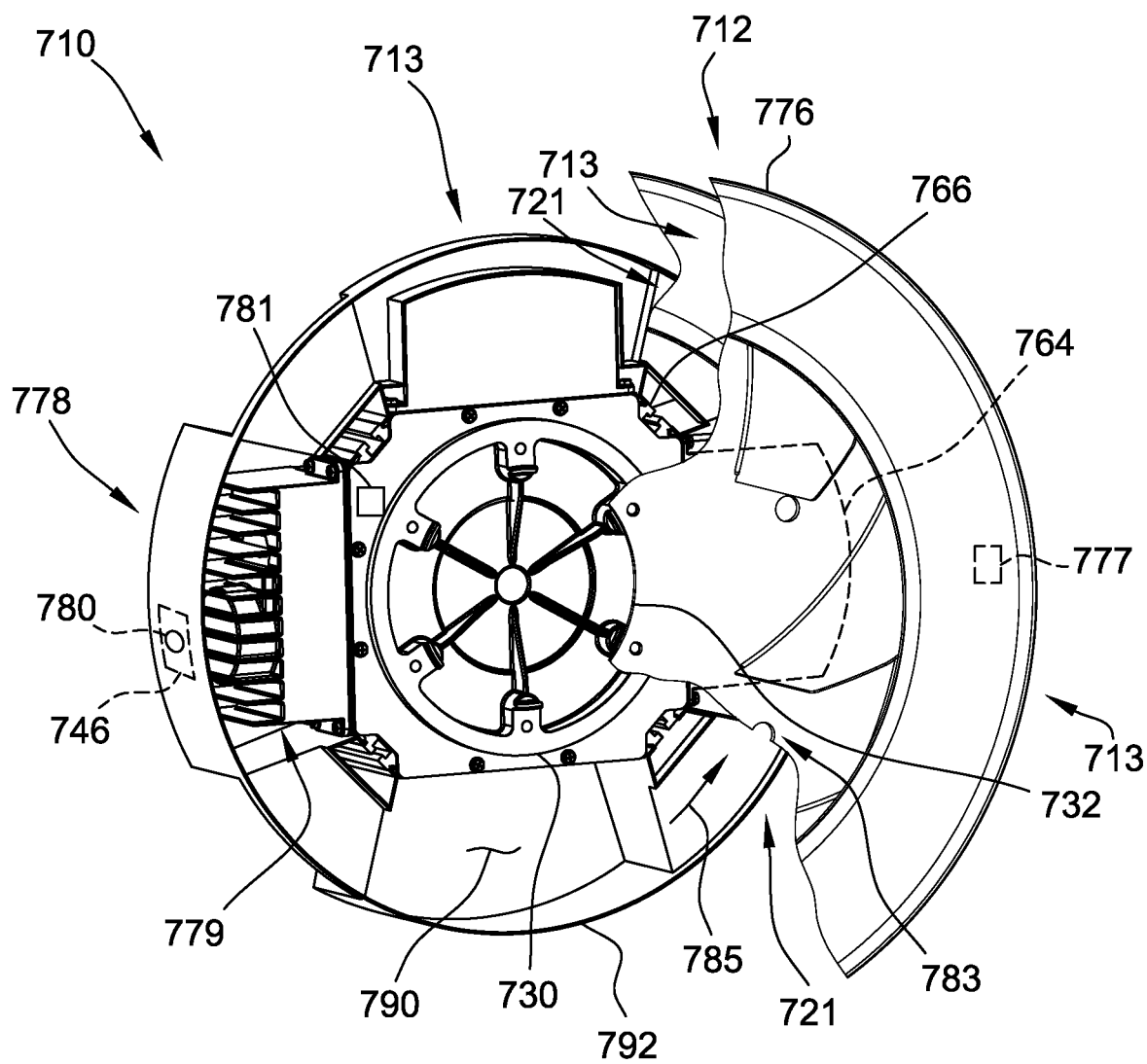
FIG. 22 is a perspective view of another embodiment of the blower motor of the present invention utilizing vents in on customer wheel to generate a pressure gradient to provide air flow to cool electrical components.
Figure 23:
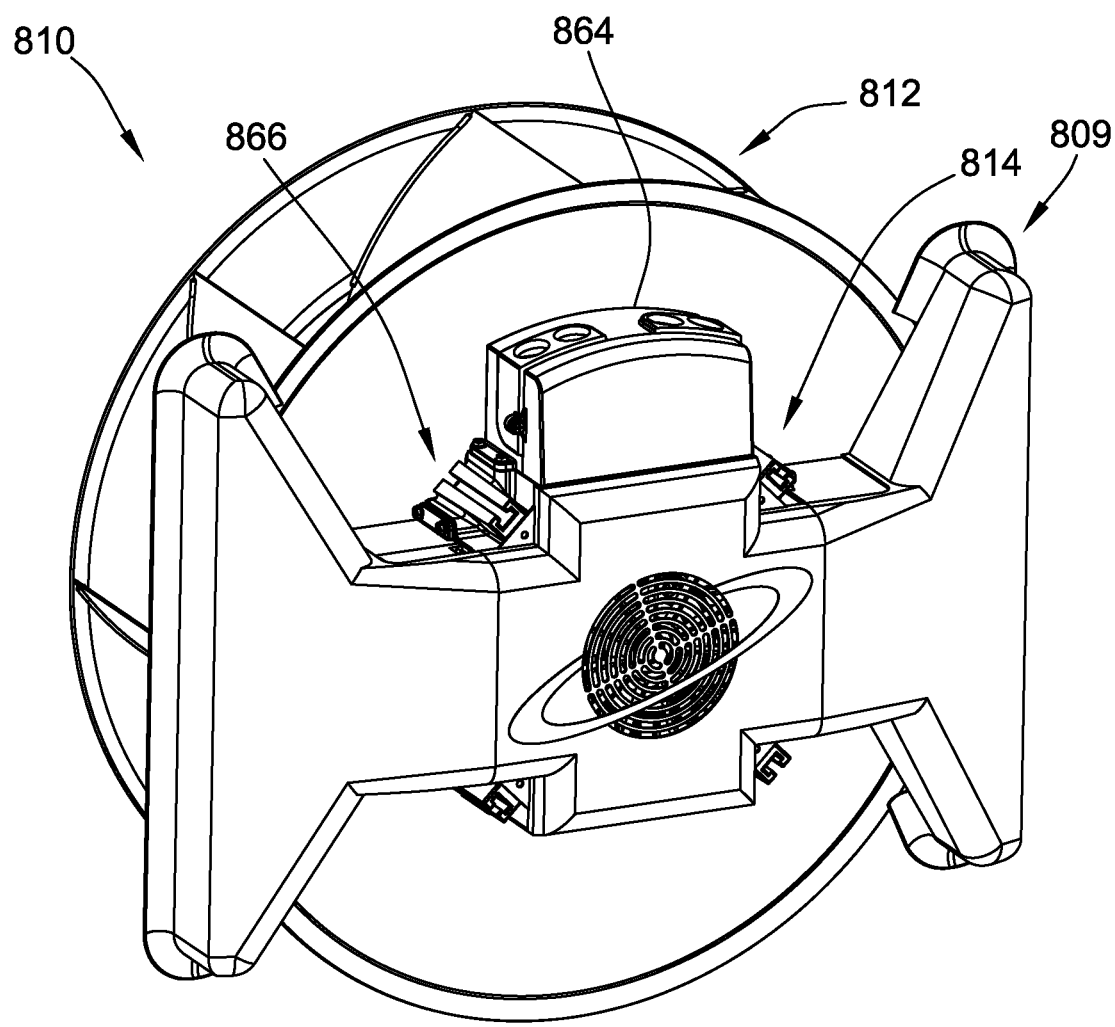
FIG. 23 is a perspective view of another embodiment of the blower of the present invention utilizing venturi nozzles on the pods to generate a pressure gradient to provide air flow to cool electrical components.
Figure 24:
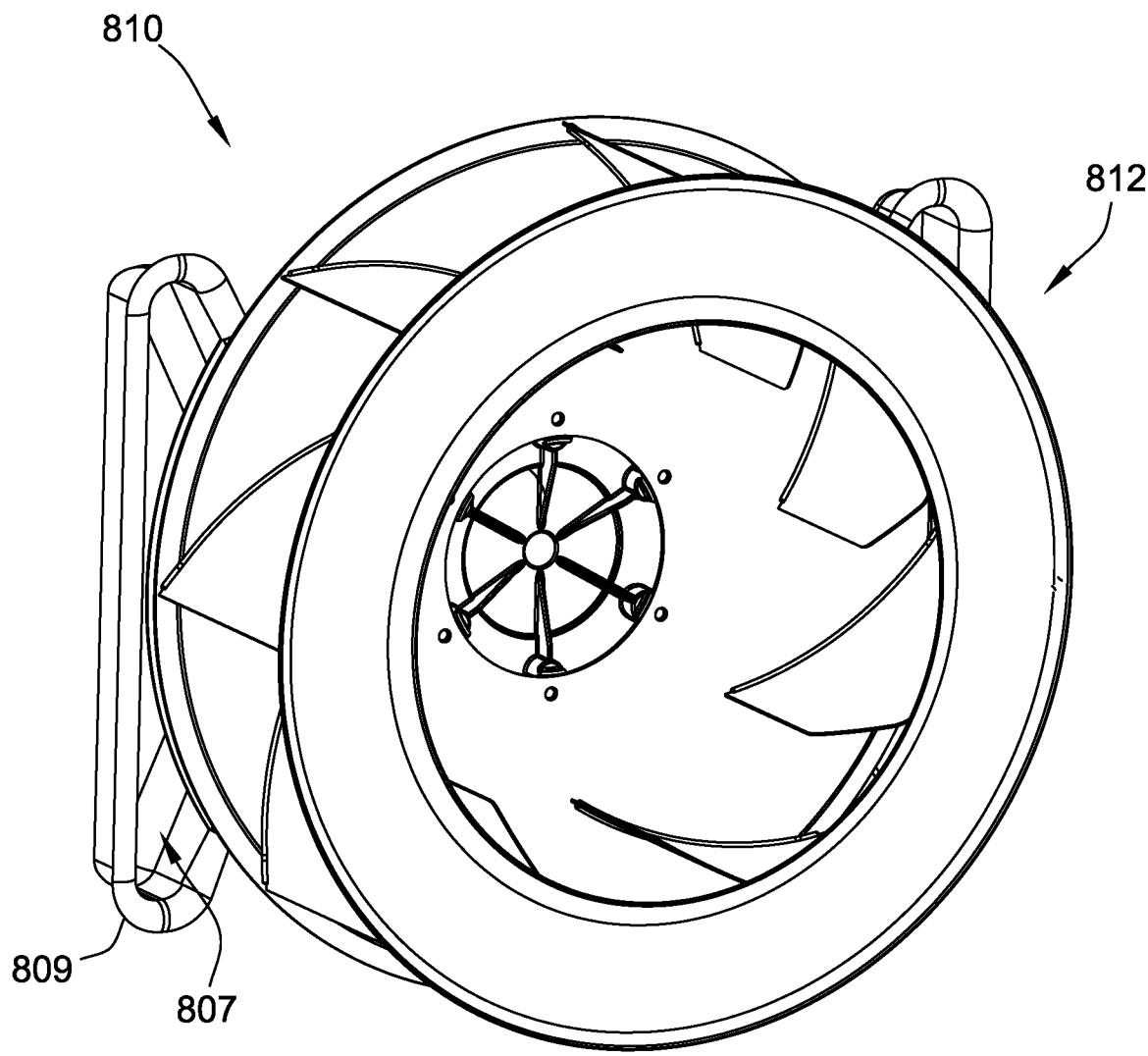
FIG. 24 is another perspective view of the blower of FIG. 23.
Figure 25:
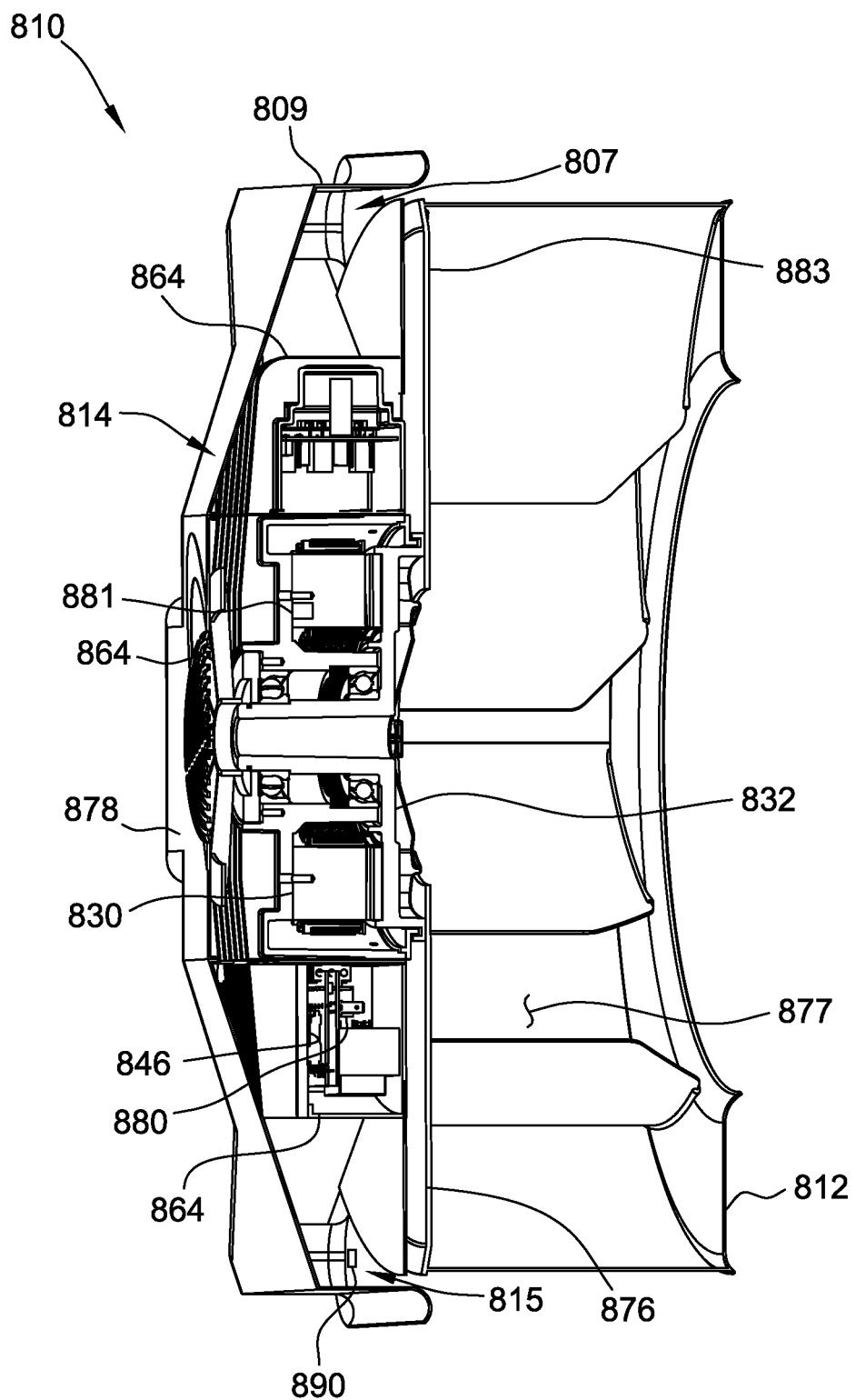
FIG. 25 is another perspective view, partly in cross-section, of the blower of FIG. 23.
Figure 26:
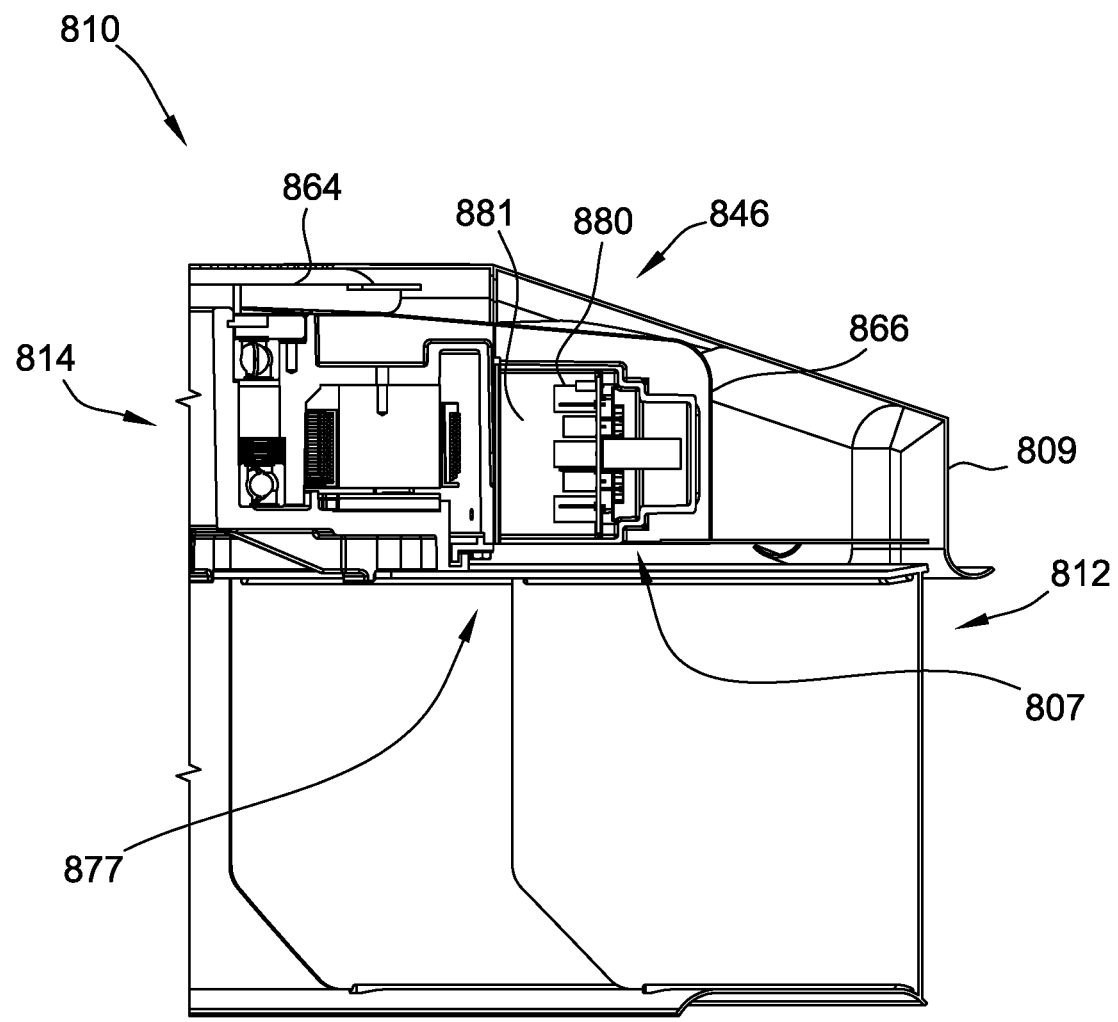
FIG. 26 is another perspective view, partly in cross-section, of the blower of FIG. 23.

Referring now to FIG. 22 and according to another aspect of the present invention, a blower 710 may be provided with a feature 721 that uses the difference in air pressure between impeller chamber 713 of impeller 712 and the motor chamber 779 of motor 714 to generate an air flow 785 and to direct that air flow 785 on heat generating electrical component 780 of controller assembly 746. The feature 721 is different than the feature 521 of the blower 510 of FIGS. 19-20.

As shown in FIG. 22, the blower 710 includes impeller housing 776; impeller 712 rotatably secured to the impeller housing 776; and electric motor 714. The electric motor 714 has a motor housing 778 with a central portion 766 and a radially extending portion 764 extending from the central portion 766, a stator 730 secured to the central portion 766 of the motor housing 778, a rotor 732 rotatably secured to the central portion 766 of the housing 778, and at least one heat generating electrical component 780 secured to the radially extending portion 764 of the motor housing 778.

As shown, the impeller housing 776 has a first air pressure 777 therein and the motor housing 776 has a second air pressure 781 therein different that the first air pressure 777. The impeller housing 776 and the motor housing 778 define a passageway 783 therebetween whereby the difference in air pressure generates air flow 785 within the motor housing 778 to cool the at least one heat generating electrical component 780.

It should be appreciated that the blower 710 and the motor 714 are similar to the blower 10 (with a fan impeller in the form of a backward curved plug fan) of FIGS. 1-9 and the motor 14 of FIGS. 1-9 (an axial flux electric motor with an electronic controller). It should also be appreciated that the blower 710 and the motor 714 may have added details and alternate configurations as described in greater detail with respect to the blower 10 and the motor 14 of FIGS. 1-9.

As shown, the blower 710 may be provided with a regulator 790 for regulating a flow of air from the impeller housing 776 toward the component 780.

As shown, the blower 710 may be provided with a feature 721 that uses the difference in air pressure between the impeller chamber 713 of the blower 710 and the motor chamber 779 of the motor 714 to generate an air flow 785 and to direct that air flow 785 on the heat generating electrical component 780.

As shown, the impeller housing 776 and the motor housing 778 may be adjoined to each other. The feature 721 may be in the form of an opening or vent or hole 727 in shroud 792 in the impeller housing 776. The opening 727 of the shroud 792 and are the motor housing 578 are aligned to permit air to flow from the impeller housing 776 to the motor housing 778 to cool the component 780.

Referring now to FIGS. 23-26 and according to another aspect of the present invention, a blower 810 including a venturi chamber 809 is provided. The chamber 809 is positioned adjacent to motor housing 878 and opposed to impeller housing 876. The difference in air pressure between the venturi chamber 809 of the blower 810 and motor chamber 879 of motor 814 is used to generate an air flow 815 and to direct that air flow 815 onto the heat generating electrical component 880.

It should be appreciated that the blower 810 and the motor 814 are similar to the blower 10 (with a fan impeller in the form of a backward curved plug fan) of FIGS. 1-9 and the motor 14 of FIGS. 1-9 (an axial flux electric motor with an electronic controller). It should also be appreciated that the blower 810 and the motor 814 may have added details and alternate configurations as described in greater detail with respect to the blower 10 and the motor 14 of FIGS. 1-9.

As shown in FIGS. 23-26, the blower 810 includes impeller housing 876; an impeller 812 rotatably secured to the impeller housing 876; and electric motor 814. The electric motor 814 has a motor housing 878 with a central portion 866 and a radially extending portion 864 extending from the central portion 866, venturi chamber 809 adjacent the motor housing 878 and opposed to the impeller housing 876, a stator 830 secured to the central portion 866 of the motor housing 878, a rotor 832 rotatably secured to the central portion 866 of the motor housing 878, and at least one heat generating electrical component 880 in the central housing 846 secured to the radially extending portion 864 of the motor housing 878. The impeller housing 876 has a first air pressure 877 therein and the motor housing 876 has a second air pressure 881 therein, different that the first air pressure 877. The venturi chamber 809 and the motor housing 878 define a passageway 883 therebetween whereby the difference in air pressure generates air flow 885 within the motor housing 878 to cool the at least one heat generating electrical component 880.

As shown, the blower 810 may further include a regulator 890 for regulating a flow of air from the impeller housing 876 toward the component 880.

As shown, the blower 810 may be provided wherein the venturi chamber 809 and the motor housing 878 are adjoined to each other and wherein the venturi chamber 809 defines opening 807 therethrough and wherein the motor housing 878 defines an opening 879 therethrough, whereby the opening 807 of the venturi chamber 809 and are the opening 879 of the motor housing 878 are aligned to permit air flow form the venturi chamber 809 to the motor housing 878.

Figure 27:
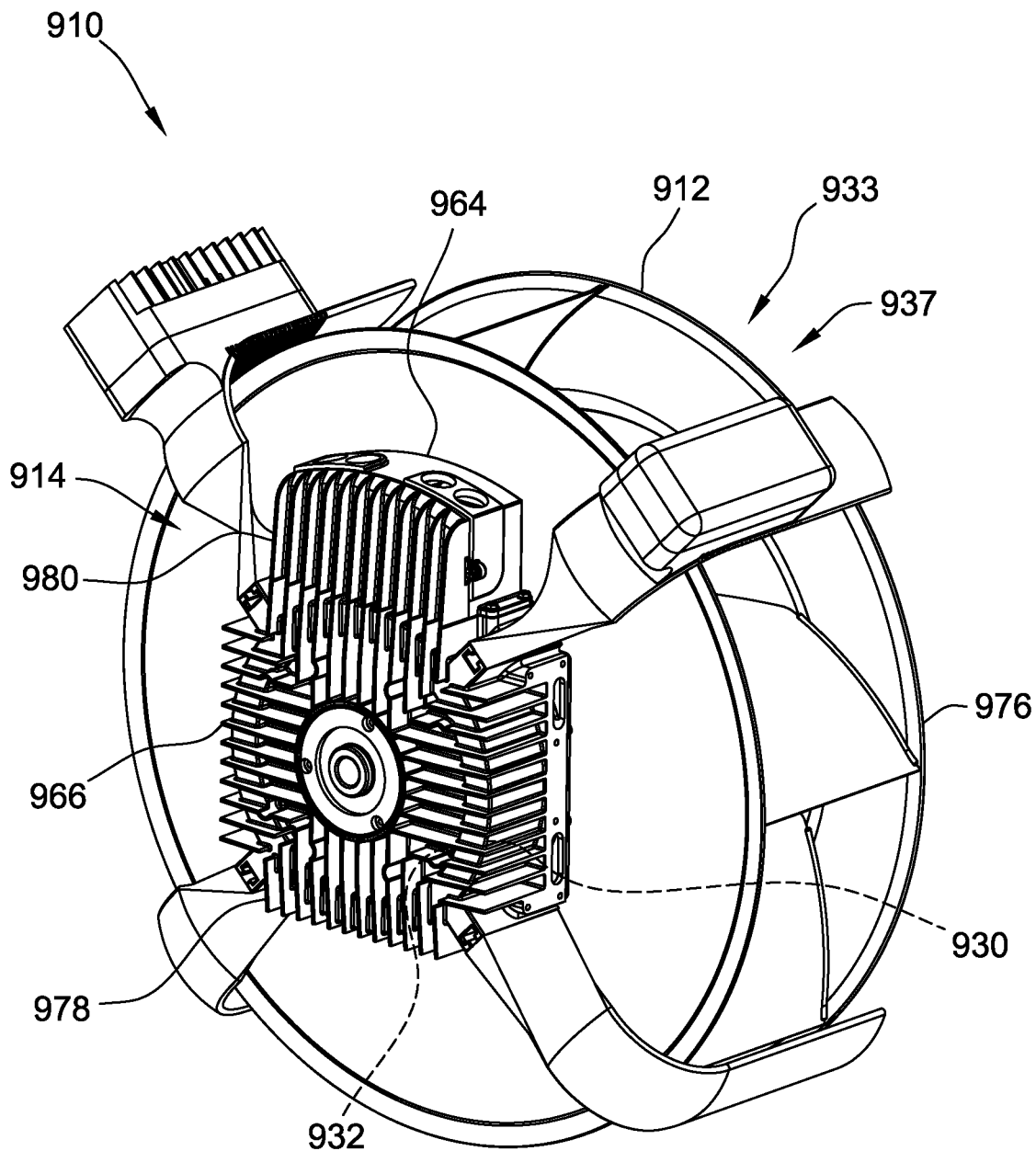
FIG. 27 is a perspective view of another embodiment of the blower of the present invention utilizing the mounting arms to mount the pods to position the electrical components where cooling may more easily occur.
Figure 28:
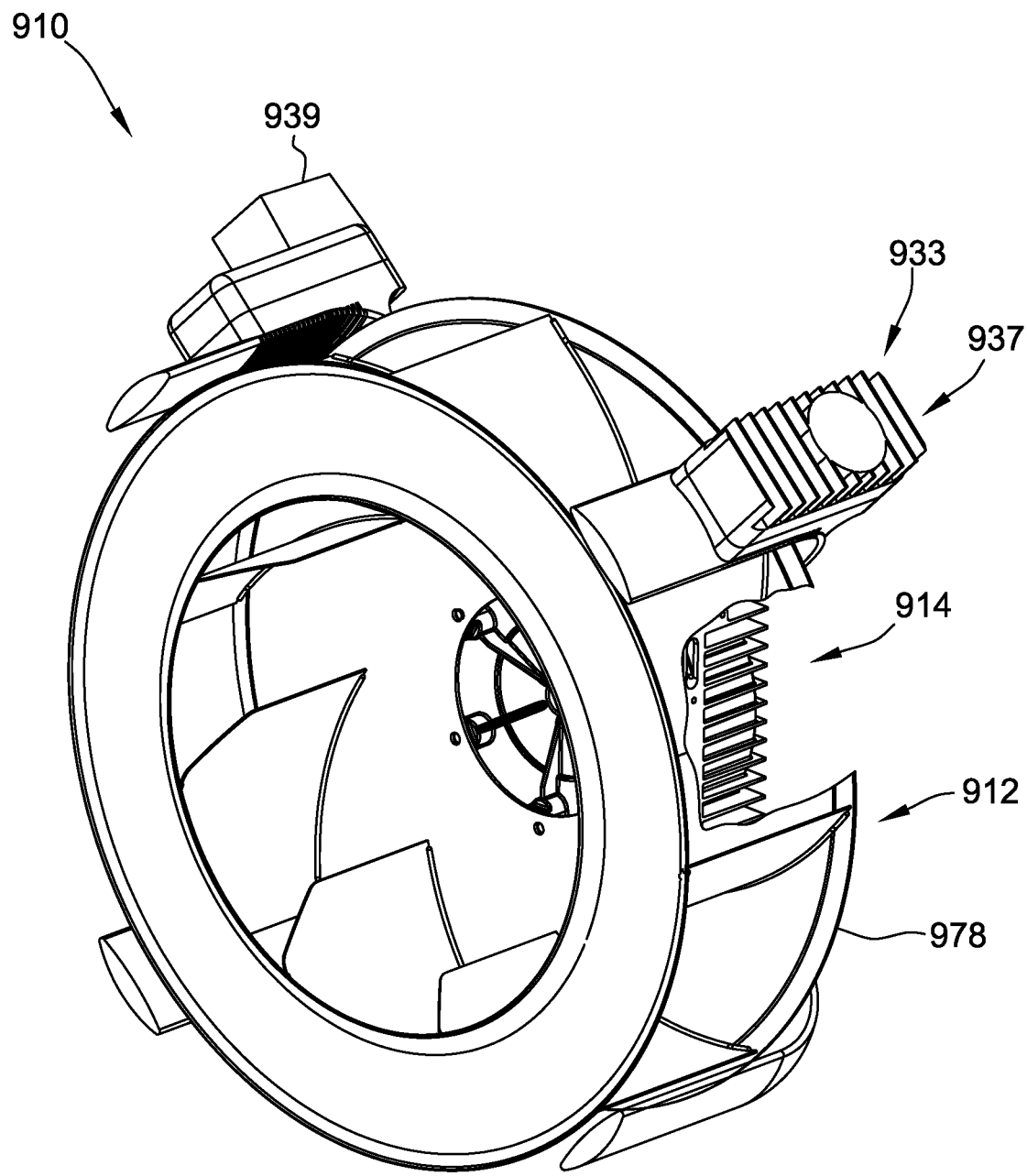
FIG. 28 is another perspective view of the blower of FIG. 27.

Referring now to FIGS. 27-28 and according to another aspect of the present invention, a blower 910 may be provided with a cooling device 933 that may be placed on mounting arms 937 of the blower 910 and may be used to transfer the cooling effect of the device 935 through the arms 937 to electrical component 980.

Figure 29:
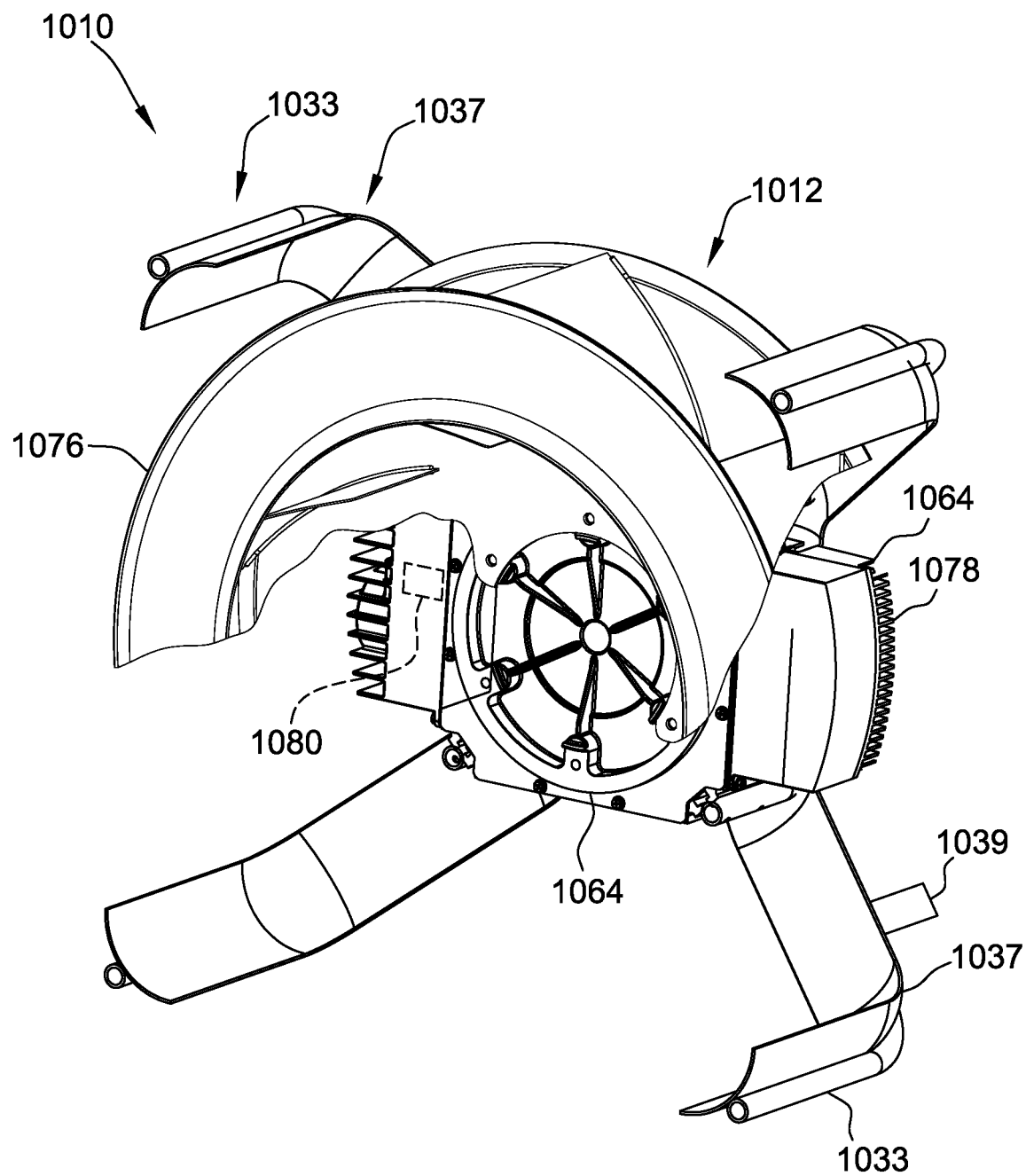
FIG. 29 is a perspective view of another embodiment of the blower of the present invention utilizing the mounting arms as cooling deflectors to cool the electrical components.
Figure 30:
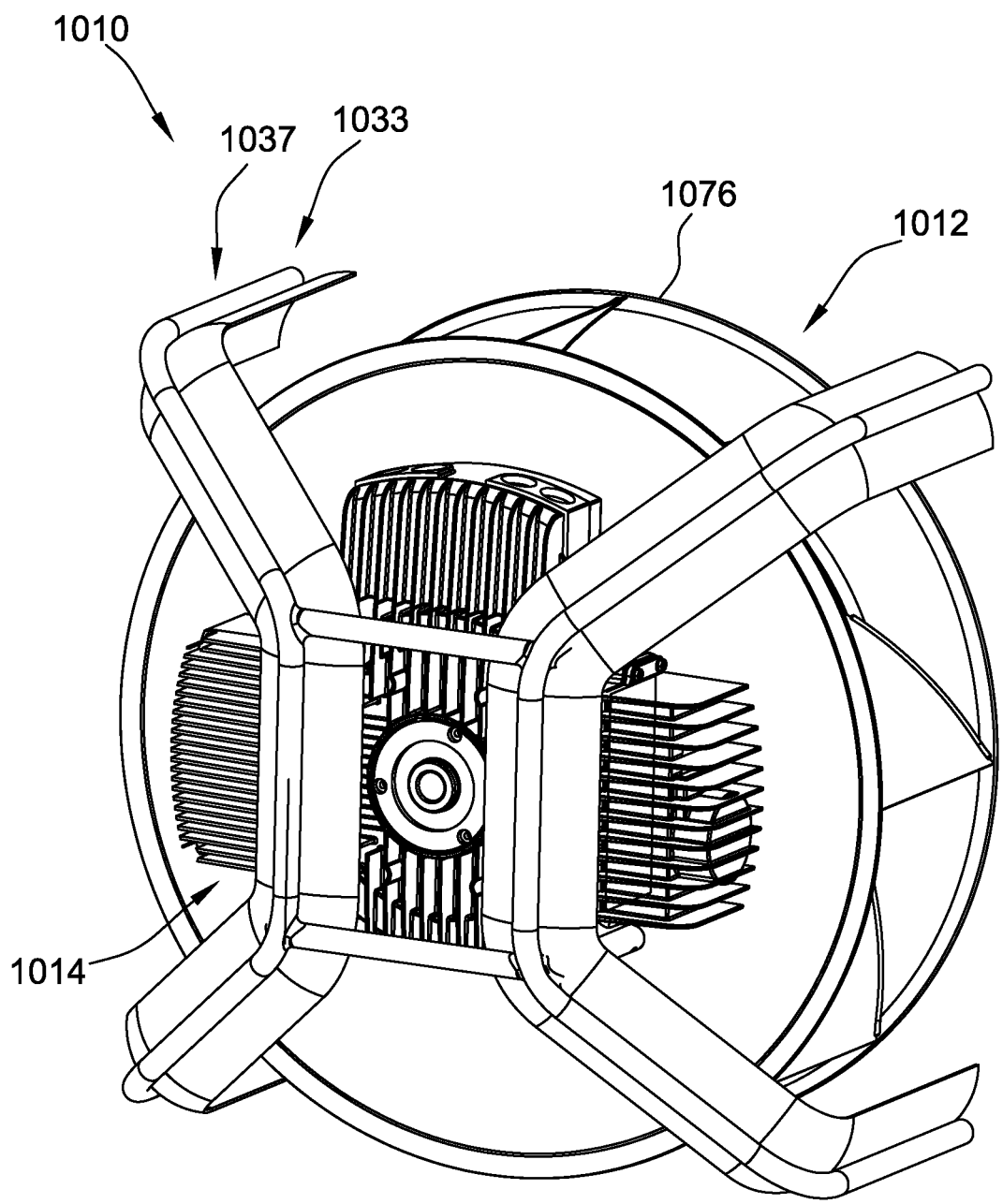
FIG. 30 is another perspective view of the blower of FIG. 29.

It should be appreciated that different cooling devices may be used provide a cooling effect and to transfer the cooling effect of the device 933 through the arms 937 to electrical component 980 and such different cooling devices include those shown in the blower 910 of FIGS. 27-28 and in blower 1010 of FIGS. 29-30.

As shown in FIGS. 27-28, the blower 910 may include a blower housing 976. The motor housing 978 of electric motor 914 has a motor housing central portion 966 and a radially extending motor portion 964 extending from the central portion 966. The blower 910 may also include an impeller 912 rotatably secured to the blower housing 976 and an electric motor 914. The electric motor 914 has a stator 930 secured to the central portion 966, a rotor 932 rotatably secured to the central portion 966, at least one heat generating electrical component 980 secured to the radially extending motor portion 966, a plurality of mounting arms 937 connected to the housing 976, and cooling device 933 connected to at least one of the arms 937. The cooling device 933 and the housing 976 are adapted to cool the at least one heat generating electrical component 980.

It should be appreciated that the blower 910 and the motor 914 are similar to the blower 10 (with a fan impeller in the form of a backward curved plug fan) of FIGS. 1-9 and the motor 14 of FIGS. 1-9 (an axial flux electric motor with an electronic controller). It should also be appreciated that the blower 910 and the motor 914 may have added details and alternate configurations as described in greater detail with respect to the blower 10 and the motor 14 of FIGS. 1-9.

As shown, the blower 910 may further include an electrical conduit box 939 positioned on one of the arms 937.

As shown, the blower 910 may be provided wherein the cooling device 933 comprises an inverter pod. The inverter pod is positioned on one of the arms 937.

As shown, the blower 910 may be provided wherein the cooling device 933 comprises a heat pipe. The heat pipe may be positioned on one of the arms 937.

As shown, the blower 910 may be provided wherein the cooling device 933 comprises a cooling deflector. The cooling deflector may be positioned on one of the arms 937.

Referring now to FIGS. 29-30 and according to another aspect of the present invention, a blower 1010 may be provided with a cooling device 1033 in the form of a cooling deflector that may be placed on mounting arms 1037 of the blower 1010 and may be used to transfer the cooling effect of the device 1033 through the arms 1037 to electrical component 1080.

As shown in FIGS. 29-30, the blower 1010 may include a blower housing 1076. The motor housing 1078 of electric motor 1014 has a motor housing central portion 1066 and a radially extending motor portion 1064 extending from the central portion 1066. The blower 1010 may also include an impeller 1012 rotatably secured to the blower housing 1076 and an electric motor 1014. The electric motor 1014 has a stator 1030 secured to the central portion 1066, a rotor 1032 rotatably secured to the central portion 1066, at least one heat generating electrical component 1080 secured to the radially extending motor portion 1066, a plurality of mounting arms 1037 connected to the housing 1076, and cooling device 1033 connected to at least one of the arms 1037. The cooling device 1033 and the housing 1076 are adapted to cool the at least one heat generating electrical component 1080.

It should be appreciated that the blower 1010 and the motor 1014 are similar to the blower 10 (with a fan impeller in the form of a backward curved plug fan) of FIGS. 1-9 and the motor 14 of FIGS. 1-9 (an axial flux electric motor with an electronic controller). It should also be appreciated that the blower 1010 and the motor 1014 may have added details and alternate configurations as described in greater detail with respect to the blower 10 and the motor 14 of FIGS. 1-9.

As shown, the blower 1010 may further include an electrical conduit box 1039 positioned on one of the arms 1037.

As shown, the blower 1010 may be provided wherein the cooling device 1033 comprises an inverter pod. The inverter pod is positioned on one of the arms 1037.

As shown, the blower 1010 may be provided wherein the cooling device 1033 comprises a heat pipe. The heat pipe may be positioned on one of the arms 1037.

As shown, the blower 1010 may be provided wherein the cooling device 1033 comprises a cooling deflector. The cooling deflector may be positioned on one of the arms 1037.

Figure 31:
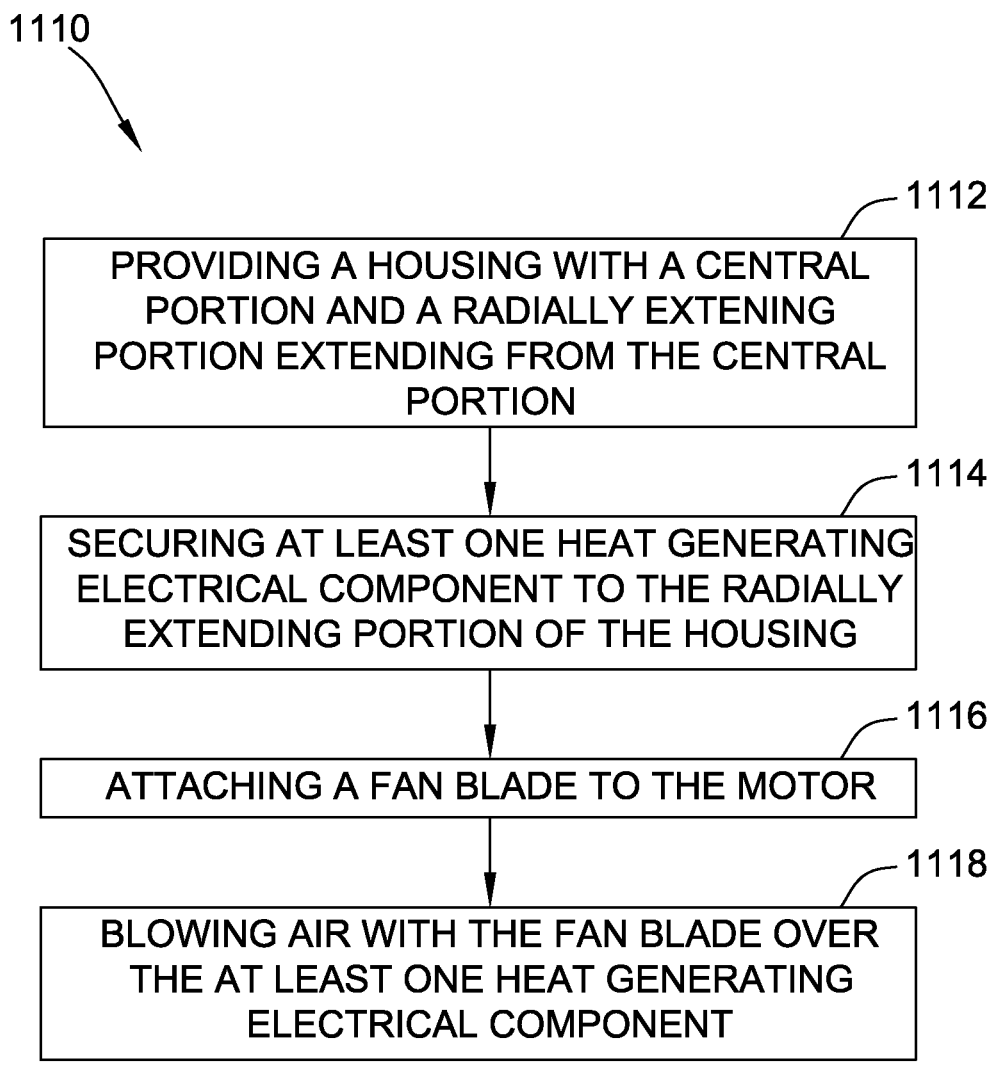
FIG. 31 is a flow chart of an exemplary method according to the present invention.

According to another aspect of the invention and referring now to FIG. 31, a method 1110 for cooling electrical components of a motor is shown. The method 1110 includes step 1112 of providing a housing with a central portion and a radially extending portion extending from the central portion, step 1114 of securing at least one heat generating electrical component to the radially extending portion of the housing, step 1116 of attaching a fan blade to the motor, and step 1118 of blowing air with the fan blade over the at least one heat generating electrical component.

The methods, systems, and apparatus described herein facilitate efficient and economical assembly of an electric motor. Exemplary embodiments of methods, systems, and apparatus are described and/or illustrated herein in detail. The methods, systems, and apparatus are not limited to the specific embodiments described herein, but rather, components of each apparatus and system, as well as steps of each method, may be utilized independently and separately from other components and steps described herein. Each component, and each method step, can also be used in combination with other components and/or method steps.

When introducing elements/components/etc. of the methods and apparatus described and/or illustrated herein, the articles "a", "an", "the", and "the" are intended to mean that there are one or more of the element(s)/component(s)/etc. The terms "comprising", "including", and "having" are intended to be inclusive and mean that there may be additional element(s)/component(s)/etc. other than the listed element(s)/component(s)/etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Described herein are exemplary methods, systems and apparatus utilizing lower cost materials in a permanent magnet motor that reduces or eliminates the efficiency loss caused by the lower cost material. Furthermore, the exemplary methods system and apparatus achieve increased efficiency while reducing or eliminating an increase of the length of the motor. The methods, system and apparatus described herein may be used in any suitable application. However, they are particularly suited for HVAC and pump applications.

Exemplary embodiments of the fluid flow device and system are described above in detail. The electric motor and its components are not limited to the specific embodiments described herein, but rather, components of the systems may be utilized independently and separately from other components described herein. For example, the components may also be used in combination with other motor systems, methods, and apparatuses, and are not limited to practice with only the systems and apparatus as described herein. Rather, the exemplary embodiments can be implemented and utilized in connection with many other applications.

Although specific features of various embodiments of the disclosure may be shown in some drawings and not in others, this is for convenience only. In accordance with the principles of the disclosure, any feature of a drawing may be referenced and/or claimed in combination with any feature of any other drawing. This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A blower, comprising:
    an impeller housing;
    an impeller rotatably secured to said impeller housing; and
    an electric motor having:
        a motor housing with a central portion and a radially extending portion extending from the central portion,
        a venturi chamber adjacent the motor housing and the impeller housing, wherein the venturi chamber is in direct flow communication with the impeller housing, wherein said venturi chamber radially overlaps the impeller,
        a stator secured to the central portion of the motor housing,
        a rotor rotatably secured to the central portion of the motor housing, and
        at least one heat generating electrical component secured to the radially extending portion of the motor housing, said electric motor configured to rotate said impeller to generate a first air pressure within said impeller housing, and said motor housing having a second air pressure therein less than the first air pressure, said venturi chamber and said motor housing defining a passageway configured to channel an air flow from said impeller housing to said at least one heat generating electrical component within said motor housing, said passageway includes a regulator for regulating a flow of air from said impeller housing toward said motor housing, therebetween whereby the difference in air pressure generates air flow within the motor housing to cool the at least one heat generating electrical component.

2. The blower according to claim 1, further comprising a second radially extending portion extending from the central portion and spaced from the first mentioned radially extending portion.

3. The blower according to claim 1, wherein the venturi chamber and the motor housing are adjoined to each other and wherein the impeller housing defines an opening therethrough and wherein the motor housing defines an opening therethrough, whereby an opening of the venturi chamber and the opening of the motor housing are aligned to permit air flow from the impeller housing to the motor housing.

4. The blower according to claim 1, wherein the radially extending portion of the motor housing defines an air outlet thereof.

5. The blower according to claim 1, wherein the motor housing includes the regulator for modifying air flow through the motor housing.

6. The blower according to claim 1, wherein the motor housing is adapted to regulate the amount of cooling going to the radially extending portion of the motor housing.

7. The blower according to claim 1, wherein the motor housing and the venturi chamber are adapted to provide an air flow directed radially.

8. A motor for using in rotating an impeller in an impeller housing of a blower, comprising:
    a motor housing with a central portion and a radially extending portion extending from the central portion;
    a stator secured to the central portion of the motor housing;
    a rotor rotatably secured to the central portion of the motor housing;
    a venturi chamber adjacent the motor housing and the impeller housing, wherein the venturi chamber is in direct flow communication with the impeller housing, wherein said venturi chamber radially overlaps the impeller;
    at least one heat generating electrical component secured to the radially extending portion of the motor housing, said electric motor configured to rotate said impeller to generate a first air pressure within said impeller housing, and said motor housing having a second air pressure therein less than the first air pressure, said venturi chamber and said motor housing defining a passageway configured to channel an air flow from said impeller housing to said at least one heat generating electrical component within said motor housing, said passageway includes a regulator for regulating a flow of air from said impeller housing toward said motor housing, therebetween whereby the difference in air pressure generates air flow within the motor housing to cool the at least one heat generating electrical component.

9. The motor according to claim 8, further comprising a second radially extending portion extending from the central portion and spaced from the first mentioned radially extending portion.

10. The motor according to claim 8, wherein said venturi chamber and the motor housing are adjoined to each other and wherein said venturi chamber defines an opening therethrough and wherein the motor housing defines an opening therethrough, whereby the opening of said venturi chamber and the opening of the motor housing are aligned to permit air blow from the impeller housing to the motor housing.

11. The motor according to claim 8, wherein the radially extending portion of the motor housing defines an air outlet thereof.

12. The motor according to claim 8, wherein the motor housing includes the regulator for modifying air flow through the motor housing.

13. The motor according to claim 8, wherein the motor housing is adapted to regulate the amount of cooling going to the radially extending portion of the motor housing.

14. A method for cooling electrical components of a motor used to rotate an impeller in a blower, comprising:

providing a motor housing with a central portion and a radially extending portion extending from the central portion;

securing at least one heat generating electrical component to the radially extending portion of the motor housing;

rotating the impeller to generate a first air pressure within an impeller housing;

subjecting the motor housing to a first second air pressure being less than the first air pressure;

coupling a venturi chamber adjacent the motor housing and the impeller housing, wherein the venturi chamber is in direct flow communication with the impeller housing, wherein said venturi chamber radially overlaps the impeller;

channeling an air flow from the impeller housing to the at least one heat generating electrical component within the motor housing, the passageway includes a regulator for regulating a flow of air from the impeller housing toward the motor housing, whereby the difference in between the first and second air pressures generates air flow within the motor housing to cool the at least one heat generating electrical component.

\* \* \* \* \*